US012647648B2

(12) United States Patent
Matsuyama

(10) Patent No.: US 12,647,648 B2
(45) Date of Patent: Jun. 2, 2026

(54) INFORMATION PROCESSING DEVICE AND INFORMATION PROCESSING METHOD

(71) Applicant: Sony Group Corporation, Tokyo (JP)

(72) Inventor: Kengo Matsuyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 16 days.

(21) Appl. No.: 18/695,003

(22) PCT Filed: Sep. 26, 2022

(86) PCT No.: PCT/JP2022/035565
§ 371 (c)(1),
(2) Date: Mar. 25, 2024

(87) PCT Pub. No.: WO2023/079859
PCT Pub. Date: May 11, 2023

(65) Prior Publication Data
US 2025/0030916 A1     Jan. 23, 2025

(30) Foreign Application Priority Data
Nov. 8, 2021     (JP) ................................. 2021-181647

(51) Int. Cl.
| *H04N 21/442* | (2011.01) |
| *H04N 21/2187* | (2011.01) |
| *H04N 21/24* | (2011.01) |
| *H04N 21/4223* | (2011.01) |

(52) U.S. Cl.
CPC ... *H04N 21/44218* (2013.01); *H04N 21/2187* (2013.01); *H04N 21/24* (2013.01); *H04N 21/4223* (2013.01)

(58) Field of Classification Search
None
See application file for complete search history.

(56) References Cited

U.S. PATENT DOCUMENTS

| 10,379,719 B2 | 8/2019 | Scapel |
| 10,897,647 B1 | 1/2021 | Hunter Crawley |
| 11,071,915 B2 * | 7/2021 | Black ...................... A63F 13/56 |
| 2016/0277802 A1 * | 9/2016 | Bernstein ......... H04N 21/44213 |
| 2017/0032336 A1 * | 2/2017 | Connell ................. G06Q 20/10 |

(Continued)

FOREIGN PATENT DOCUMENTS

| JP | 2009182410 A | 8/2009 |
| JP | 2013-021466 A | 1/2013 |

(Continued)

*Primary Examiner* — Alexander Q Huerta
(74) *Attorney, Agent, or Firm* — XSENSUS LLP

(57) ABSTRACT

Provided are an information processing device and an information processing method capable of dynamically controlling an information amount of reaction information of a user viewing a distribution content. The information processing device includes: a user reaction information control unit configured to perform information control for causing a user terminal to output second user reaction information having an information amount different from an information amount of first user reaction information on a basis of the first user reaction information output from the user terminal used by a user viewing a distribution content and indicating a reaction of the user.

16 Claims, 17 Drawing Sheets

(56)     References Cited

U.S. PATENT DOCUMENTS

| | | | | |
|---|---|---|---|---|
| 2020/0275159 A1* | 8/2020 | Sarkar | ................ | H04N 21/2541 |
| 2022/0038580 A1* | 2/2022 | Li | ........................ | H04L 12/1818 |
| 2022/0038774 A1* | 2/2022 | Paz | ...................... | H04N 21/632 |
| 2022/0182251 A1* | 6/2022 | Jacobs | .............. | H04N 21/4821 |
| 2022/0201250 A1* | 6/2022 | Schoenborn | ........... | H04R 1/403 |
| 2022/0358308 A1* | 11/2022 | Hernandez Rivera | ....................... | |
| | | | | H04L 12/1831 |
| 2022/0408122 A1* | 12/2022 | Khanna | .............. | H04N 21/4788 |
| 2023/0156245 A1* | 5/2023 | Resnick | ........... | H04N 21/23418 |
| | | | | 725/109 |
| 2023/0199231 A1* | 6/2023 | Fredette | .......... | H04N 21/21805 |
| | | | | 725/105 |

FOREIGN PATENT DOCUMENTS

| | | | |
|---|---|---|---|
| JP | 2019-126101 A | 7/2019 | |
| JP | 2020-109895 A | 7/2020 | |
| JP | 2021-053238 A | 4/2021 | |
| WO | WO-2014003965 A1 | 1/2014 | |
| WO | WO 2016/009865 A1 | 1/2016 | |
| WO | WO 2021/095573 A1 | 5/2021 | |
| WO | WO-2021161894 A1 | 8/2021 | |

* cited by examiner

Figures 2, 3:
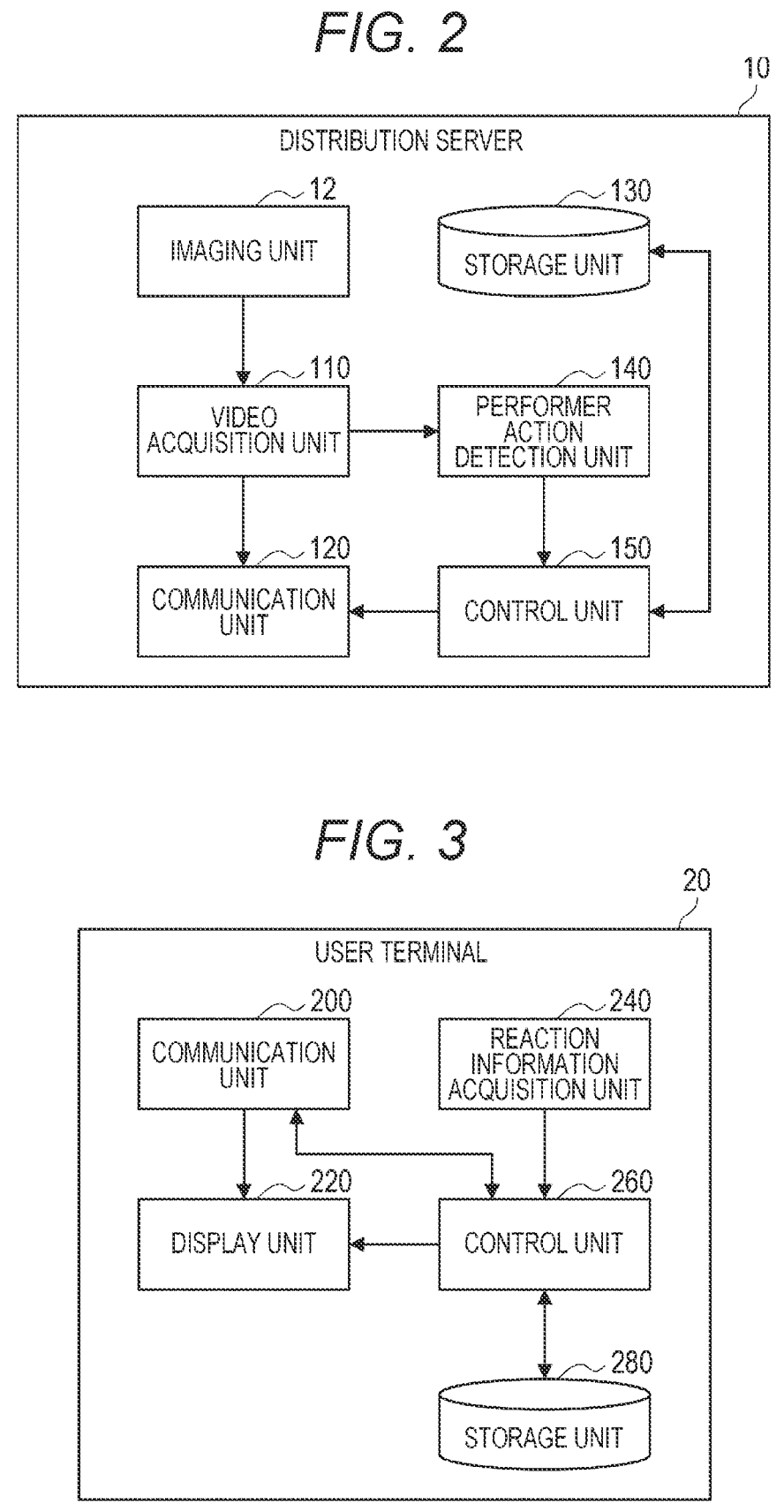

DISTRIBUTION SERVER

12
IMAGING UNIT

130
STORAGE UNIT

110
VIDEO ACQUISITION UNIT

140
PERFORMER ACTION DETECTION UNIT

120
COMMUNICATION UNIT

150
CONTROL UNIT

USER TERMINAL

200
COMMUNICATION UNIT

240
REACTION INFORMATION ACQUISITION UNIT

220
DISPLAY UNIT

260
CONTROL UNIT

280
STORAGE UNIT

| REACTION INFORMATION ID | PREDETERMINED REACTION OF USER | USER REACTION INFORMATION TO BE TRANSMITTED | INFORMATION AMOUNT |
|---|---|---|---|
| 1 | WAVING ARM | ANGULAR VELOCITY OF HAND | 1byte |
| 2 | WAVING TOWEL | WAVING / NOT WAVING TOWEL | 1byte |
| 3 | SWINGING BODY (DANCING) | SWINGING / NOT SWINGING BODY | 1byte |
| 4 | JUMPING | JUMPING / NOT JUMPING | 1byte |
| 5 | APPLAUDING | APPLAUDING / NOT APPLAUDING | 1byte |
| 6 | SHAKING HEAD | SHAKING HEAD / NOT SHAKING HEAD | 1byte |
| 7 | WAVING | WAVING / NOT WAVING | 1byte |
| 8 | SHAKING LIGHT | SHAKING LIGHT / NOT SHAKING LIGHT | 1byte |

| ACTION INFORMATION ID | PREDETERMINED ACTION OF PERFORMER | USER REACTION INFORMATION TO BE TRANSMITTED | INFORMATION AMOUNT |
|---|---|---|---|
| 1 | WAVING HAND | ANGULAR VELOCITY OF HAND | 1byte |
| 2 | WAVING TOWEL | ROTATION SPEED OF HAND | 1byte |
| 3 | WAVE REQUEST | WAVING/NOT WAVING | 1byte |
| 4 | APPLAUDING | APPLAUDING/NOT APPLAUDING | 1byte |

| REFERENCE | SECTION |
|---|---|
| x < 3 SECONDS | SECTION 1 |
| 3 SECONDS ≤ x < 5 SECONDS | SECTION 2 |
| 5 SECONDS ≤ x | SECTION 3 |

| SECTION | USER REACTION INFORMATION TO BE TRANSMITTED | INFORMATION AMOUNT |
|---|---|---|
| SECTION 1 | WHOLE-BODY VIDEO | 597 × 256byte |
| SECTION 2 | FACE VIDEO | 128 × 128byte |
| | MOTION CAPTURE INFORMATION | 13 × 3byte |
| SECTION 3 | EMOTION (DELIGHT, IMPRESSION, SURPRISE, EXCITEMENT) AND DEGREE | 16byte |
| | WAVING ARM | 1byte |
| | SWINGING BODY (DANCING) | 1byte |
| | JUMPING | 1byte |
| | APPLAUDING | 1byte |
| | SHAKING HEAD | 1byte |
| | WAVING | 1byte |
| | SHAKING LIGHT | 1byte |

T11

| REACTION INFORMATION ID | PREDETERMINED REACTION OF USER | SECTION 1 | SECTION 2 | SECTION 3 |
|---|---|---|---|---|
| 1 | WAVING ARM | | Mocap (HAND AND ARM) | ANGULAR VELOCITY OF HAND |
| 2 | WAVING TOWEL | | Mocap (HAND AND ARM) | WAVING/NOT WAVING TOWEL |
| 3 | SWINGING BODY (DANCING) | WHOLE-BODY VIDEO | Mocap (WHOLE BODY) | SWINGING/NOT SWINGING BODY |
| 4 | JUMPING | FACE VIDEO | Mocap (WHOLE BODY) | JUMPING/NOT JUMPING |
| 5 | APPLAUDING | | Mocap (HAND AND ARM) | APPLAUDING/NOT APPLAUDING |
| 6 | SHAKING HEAD | | Mocap (HEAD) | SHAKING HEAD/NOT SHAKING HEAD |
| 7 | WAVING | | Mocap (WHOLE BODY) | WAVING/NOT WAVING |
| 8 | SHAKING LIGHT | | Mocap (HAND AND ARM) | SHAKING LIGHT/NOT SHAKING LIGHT |

FIG. 19

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2022/035565 (filed on Sep. 26, 2022) under 35 U.S.C. § 371, which claims priority to Japanese Patent Application No. 2021-181647 (filed on Nov. 8, 2021), which are all hereby incorporated by reference in their entirety.

TECHNICAL FIELD

The present disclosure relates to an information processing device and an information processing method.

BACKGROUND ART

In recent years, live distribution has been actively performed in which a video and a voice are distributed from a venue where a music live show and manzai are performed to a user terminal outside the venue. According to the live distribution, a user who is outside the venue, and further a user who is in a remote place such as outside the country can also enjoy a music live show, a manzai, and the like.

In general, the form of live distribution includes a unidirectional type and a bidirectional type. In the unidirectional live distribution, only a performance video of a performer is transmitted to the user side. For this reason, in the unidirectional live distribution, the reaction on the user side is unknown from the performer side, and there are cases where the performer feels alone and where it is difficult to feel a sense of unity with the live audience. Therefore, in the bidirectional live distribution, a means for conveying a figure or a reaction on the user side to the performer side by some means is considered.

For example, Patent Document 1 discloses a technology in which an avatar representing a user viewing live distribution outside a venue is displayed at an event venue, which is a real space in which an event is being held, so that the user can feel as if the user is participating in the live show even outside the venue.

CITATION LIST

Patent Document

Patent Document 1: Patent Document 1: Japanese Patent Application Laid-Open No. 2013-21466

SUMMARY OF THE INVENTION

Problems to be Solved by the Invention

However, in the two-way live distribution, as the number of users increases, the amount of information gathered on the distribution side becomes enormous. Therefore, there is a problem that a load is applied to a server or a line on the distribution side, leading to a possibility that processing takes time or information is lost.

Therefore, the present disclosure has been made in view of the above problem, and an object of the present disclosure is to provide a new and improved information processing device capable of dynamically controlling the information amount of the reaction information of the user viewing the distribution content.

Solutions to Problems

In order to solve the above problem, according to an aspect of the present disclosure, there is provided an information processing device including: a user reaction information control unit configured to perform information control for causing a user terminal to output second user reaction information having an information amount different from an information amount of first user reaction information on the basis of the first user reaction information output from the user terminal used by a user viewing a distribution content and indicating a reaction of the user.

Furthermore, in order to solve the above problem, according to another aspect of the present disclosure, there is provided an information processing device including: a user reaction information control unit configured to perform information control of outputting second user reaction information having an information amount different from an information amount of first user reaction information to a user terminal that is used by a user viewing a distribution content and is outputting the first user reaction information indicating a reaction of the user on a basis of performer action information indicating an action of a performer appearing in the distribution content.

Furthermore, in order to solve the above problem, according to another aspect of the present invention, there is provided an information processing method including: causing, by a processor, a user terminal to output second user reaction information having an information amount different from an information amount of first user reaction information on the basis of the first user reaction information output from the user terminal used by a user viewing a distribution content and indicating a reaction of the user.

Effects of the Invention

As described above, according to the present disclosure, it is possible to dynamically control the information amount of the reaction information of the user viewing the distribution content.

BRIEF DESCRIPTION OF DRAWINGS

FIG. 2 is an explanatory diagram illustrating a functional configuration example of a distribution server 10 according to the same embodiment.

FIG. 3 is an explanatory diagram illustrating a functional configuration example of a user terminal 20 according to the same embodiment.

FIG. 5 is an explanatory diagram illustrating a specific example of a user-specific reaction table stored in a storage unit 310 according to the same embodiment.

FIG. 9 is an explanatory diagram illustrating a specific example of a performer specification action table stored in a storage unit 310 according to the same embodiment.

FIG. 11 is an explanatory diagram illustrating a specific example of a communication situation reference table stored in the storage unit 310 according to the same embodiment.

FIG. 12 is an explanatory diagram illustrating a specific example of a section table stored in the storage unit 310 according to the same embodiment.

FIG. 14 is a specific example of a screen displayed on a display unit 32 under the control of a display screen generation unit 326 according to the same embodiment.

FIG. 16 is a second specific example of the user-specific reaction table stored in the storage unit 310 according to the same embodiment.

FIG. 19 is a block diagram illustrating a hardware configuration example of an information processing device that implements the information processing system 1 according to the embodiment of the present disclosure.

MODE FOR CARRYING OUT THE INVENTION

Figure 1:
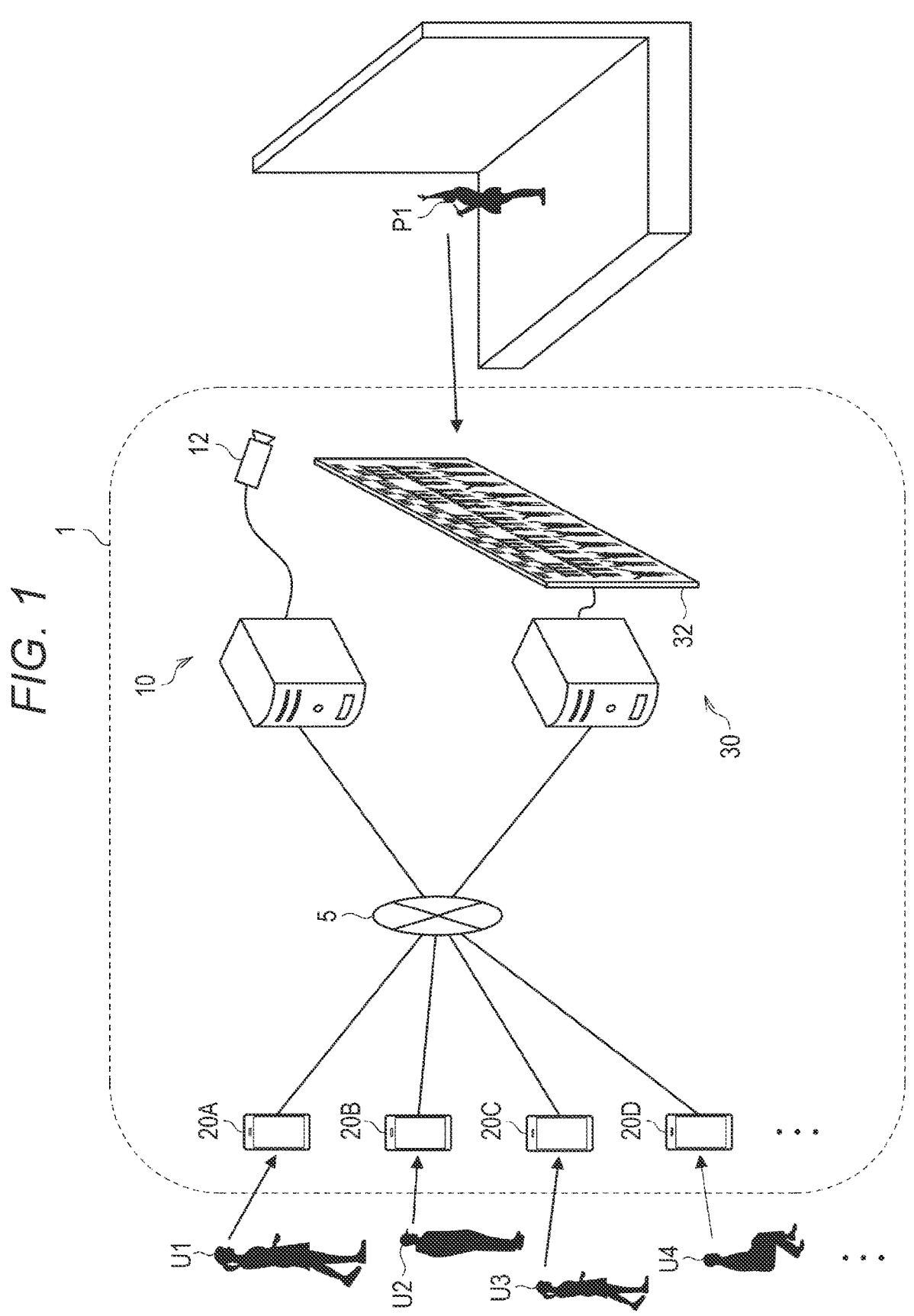
FIG. 1 is an explanatory diagram illustrating a configuration of an information processing system 1 according to an embodiment of the present disclosure.

Hereinafter, preferred embodiments of the present invention will be described in detail with reference to the accompanying drawings. Note that, in the present specification and the drawings, components having substantially the same functional configurations are denoted by the same reference signs, and redundant descriptions are omitted.

Furthermore, in this specification and the drawings, there is a case in which a plurality of components having substantially the same functional configuration is distinguished from each other with different alphabets attached after the same reference sign. However, in a case where it is not necessary to particularly distinguish each of the plurality of components having substantially the same functional configuration, only the same reference numeral is attached to each of the plurality of components.

Note that, the "mode for carrying out the invention" will be described according to the following order of items.

1. Overview of information processing system according to embodiment of present disclosure
2. Description of functional configuration example according to present embodiment
2-1. Functional configuration example of distribution server 10
2-2. Functional configuration example of user terminal 20
2-3. Functional configuration example of information processing device 30
3. Description of operation processing example according to present embodiment
3-1. Operation Example 1
3-2. Operation Example 2

3-3. Operation Example 3
3-4. Operation Example 4
3-5. Supplement
4. Hardware configuration example
5. Conclusion 1. OVERVIEW OF INFORMATION PROCESSING SYSTEM ACCORDING TO EMBODIMENT OF PRESENT DISCLOSURE FIG. 1 is a diagram for explaining an overview of an information processing system according to an embodiment of the present disclosure. As illustrated in FIG. 1, an information processing system 1 according to the present embodiment includes a distribution server 10, a plurality of user terminals 20, and an information processing device 30. As illustrated in FIG. 1, the distribution server 10, the user terminals 20, and the information processing device 30 are configured to be communicable via a network 5.

In the present embodiment, live distribution of a music live show in which video and audio of a performer imaged at a live venue or a studio are provided to a user at a remote place in real time will be described as an example. The remote place means a place different from the place where the performer is. The content to be distributed is not limited to a music live show, and includes a performance performed in front of an audience, such as manzai, a play, or a dance. Furthermore, the distributed content may be another content. In addition, the format of the music live show to be distributed is not limited, and the distribution server 10 may distribute a video of a two-dimensional music live show or a volumetric video.

In the example illustrated in FIG. 1, the distribution server 10 includes an imaging unit 12. The imaging unit 12 images a performer P1 performing a performance in the live venue. The distribution server 10 acquires the video of the performer P1 imaged by the imaging unit 12 and generates a distribution video information including the video. The distribution video information is an example of the distribution content. The distribution server 10 distributes the distribution video information to the user terminals 20 via the network 5. Note that, the distribution server 10 may include a sound collection unit (not illustrated), and the distribution video information may include sound obtained by a sound collection unit.

Furthermore, the distribution server 10 detects an action of the performer P1 and transmits the detected action information to the information processing device 30. FIG. 1 illustrates an example of the performer P1 who is a person performing a performance as the performer according to the present embodiment, but the number of performers may be plural. Furthermore, the performer is not limited to a human, and may be an animal or a robot, and widely includes an object to be imaged.

The user terminal 20 is an information processing terminal used by a user U. The user terminal 20 is an information processing device including a function of outputting a video or an audio and a sensor that detects a state or action of the user. The user terminal 20 may include a plurality of information processing devices or may be a single information processing device. In the example illustrated in FIG. 1, the user terminal 20 is a smartphone, presents the distribution video information to the user U, images the user U with a built-in camera, and detects the state or action of the user U. Alternatively, the user terminal 20 may be implemented by a non-transmissive head mounted display (HMD) that covers the entire field of view of the user. Furthermore, the user terminal 20 may be implemented by combining various devices such as a tablet terminal, a personal computer (PC), a projector, a game terminal, a television device, a wearable device, and a motion capture device in addition to a smartphone.

The user terminal 20 receives the distribution video information from the distribution server 10, and presents the distribution video information to the user U. With this configuration, the user U can view the video of the performer P1 from a remote place. Furthermore, the user terminal 20 detects a reaction shown while the user U is viewing the video of the performer P1, and transmits user reaction information indicating the reaction to the information processing device 30. Here, the transmission of the user reaction information by the user terminal 20 is a form of output of the user reaction information by the user terminal 20. Furthermore, the user reaction information may be first user reaction information or second user reaction information having an information amount different from that of the first user reaction information.

In the example illustrated in FIG. 1, a user U1 uses a user terminal 20A. Similarly, a user U2 uses a user terminal 20B, a user U3 uses a user terminal 20C, and a user U4 uses a user terminal 20D. In addition, the users U1 to U4 view the live distribution at different places. Alternatively, the users U1 to U4 may view the live distribution at the same place. In that case, the number of user terminals 20 may be one, and a plurality of users U may view the distribution video information presented by one user terminal 20. For example, the user terminal 20 may be configured such that a plurality of users U can view the live distribution on one screen in a movie theater, a concert hall, or the like.

The information processing device 30 generates user information indicating the user U on the basis of the user reaction information received from the user terminal 20. The information processing device 30 outputs the generated user information to the display unit 32. The performer P1 can perform a performance while watching the reaction of the user by presenting the user information by the display unit 32.

Furthermore, the information processing device 30 controls information to be transmitted to the user terminal 20 as the user reaction information. The information processing device 30 controls the information on the basis of at least one or more of performer action information including the action information of the performer P1 received from the distribution server 10, the user reaction information received from the user terminal 20, a situation of a communication path for transmitting and receiving the user reaction information to and from the user terminal 20, or a situation of an information processing load of the information processing device 30 itself.

Review of Problems

In general, in a two-way live distribution in which reaction information on the user side viewing the live distribution is transmitted to the distributor side while the video of the performer is distributed live, the amount of information gathered on the distribution side becomes enormous as the number of users increases. Therefore, there is a problem that a load is applied to a server or a line on the distribution side, leading to a possibility that processing takes time or information is lost.

The inventor of the present application has created the embodiment of the present disclosure by focusing on the above circumstances. According to the embodiment of the present disclosure, it is possible to dynamically control the total amount of the reaction information of the user viewing the distribution content. Here, the total amount of the reaction information of the user refers to the total amount of information indicating the state or action of the user at a certain time point included in the user reaction information to be transmitted from each of the plurality of user terminals 20 to the information processing device 30. For example, the total amount of the reaction information of the user U1 illustrated in FIG. 1 refers to the total amount of information indicating the action or state of the user U1 at a certain time point, which is transmitted as the user reaction information from the user terminal 20A to the information processing device 30. Hereinafter, the configuration and operation of such an information processing device 30 according to the embodiment of the present disclosure will be sequentially described in detail.

2. DESCRIPTION OF FUNCTIONAL CONFIGURATION EXAMPLE ACCORDING TO PRESENT EMBODIMENT

2-1. Functional Configuration of Distribution Server 10

FIG. 2 is an explanatory diagram illustrating a functional configuration example of the distribution server 10 according to an embodiment of the present disclosure. As illustrated in FIG. 2, the distribution server 10 according to the present embodiment includes an imaging unit 12, a video acquisition unit 110, a communication unit 120, a storage unit 130, a performer action detection unit 140, and a control unit 150.

(Imaging Unit and Video Acquisition Unit)

The imaging unit 12 is an imaging device that images the performer P1. The video acquisition unit 110 acquires the video of the performer P1 from the imaging unit 12. Moreover, the video acquisition unit 110 generates distribution video information including the video of the performer P1 and the time information, and supplies the distribution video information to the communication unit 120. Note that, the distribution video information may be constructed with a plurality of packets, and the time information may be time stamp information included in each packet.

(Communication Unit)

The communication unit 120 includes a communication interface, and communicates with the user terminal 20 and the information processing device 30 via the network 5. For example, the communication unit 120 transmits the distribution video information supplied from the video acquisition unit 110 to the user terminal 20.

(Storage Unit)

The storage unit 130 is a storage device capable of storing a program and data for operating the control unit 150. Furthermore, the storage unit 130 can also temporarily store various data required in the process of the operation of the control unit 150. For example, the storage device may be a non-volatile storage device.

(Performer Action Detection Unit)

The performer action detection unit 140 has a function of detecting the action of the performer P1. The performer action detection unit 140 analyzes the video of the performer P1 acquired from the imaging unit 12 and detects the action of the performer P1. Alternatively, the performer action detection unit 140 may include various sensors that detect the state of the performer, and detect the action of the performer P1 by analyzing the sensing data. For example, the performer action detection unit 140 may be a camera, an IR sensor, or a microphone. The performer action detection unit 140 may detect the expression of the face of the viewer (eyes, eyebrows, mouth movement, and the like) or the line-of-sight using the camera. Furthermore, the performer action detection unit 140 may detect the utterance voice of the performer by, for example, a microphone. Furthermore, the performer action detection unit 140 may be an inertial measurement unit (IMU), a biometric sensor, or the like, and the performer action detection unit 140 may detect the action of the performer P1 when the performer P1 performs a performance by wearing the performer action detection unit 140. For example, the performer action detection unit 140 may detect the movement of the performer P1 (position, posture, movement of limbs, movement of head, and the like) by the IMU. Furthermore, the performer action detection unit 140 may include a plurality of types of sensors.

Furthermore, in the present embodiment, the performer action detection unit 140 detects the state or action of the performer P1 at a regular time interval. The regular time interval may be set in advance. For example, the regular time interval may be 20 microseconds. Alternatively, the regular time interval may be dynamically changed during the live distribution according to the situation of the communication path of the distribution server 10 or the state of the information processing load of the information processing device 30.

(Control Unit)

The control unit 150 includes a central processing unit (CPU) and the like, and a function thereof can be implemented by the CPU developing a program stored in the storage unit 130 in a random access memory (RAM) and executing the program. At this time, a computer-readable recording medium in which the program is recorded can also be provided. Alternatively, the control unit 150 may be configured by dedicated hardware, or may be configured by a combination of a plurality of pieces of hardware. Such a control unit 150 controls the overall operation in the distribution server 10. For example, the control unit 150 controls communication between the communication unit 120 and the information processing device 30, and communication between the communication unit 120 and the user terminal 20.

2-2. Functional Configuration of User Terminal 20

The configuration of the distribution server 10 has been described above. Next, a functional configuration of the user terminal 20 according to the present embodiment will be described with reference to FIG. 3.

FIG. 3 is an explanatory diagram illustrating a functional configuration example of the user terminal 20 according to the present embodiment. The user terminal 20 according to the present embodiment includes a communication unit 200, a display unit 220, a reaction information acquisition unit 240, a control unit 260, and a storage unit 280.

(Communication Unit)

The communication unit 200 includes a communication interface, and communicates with the distribution server 10 and the information processing device 30 via the network 5. For example, the communication unit 200 receives the distribution video information from the distribution server 10, and transmits user reaction information to be described later to the information processing device 30.

(Display Unit)

The display unit 220 has a function of displaying various types of information under the control of the control unit

260. For example, the display unit 220 can display the video of the performer P1 on the basis of the distribution video information received by the communication unit 200 from the distribution server 10. Here, the form of the display unit 220 may be, for example, a liquid crystal display (LCD) device or an organic light emitting diode (OLED) device.

(Reaction Information Acquisition Unit)

The reaction information acquisition unit 240 has a function of detecting the state or action of the user U who is viewing the live distribution. The reaction information acquisition unit 240 is implemented by various sensors that detect a state or action of the user. For example, the reaction information acquisition unit 240 may be an IMU, a camera, an IR sensor, a microphone, a biological sensor, or the like. In the example illustrated in FIG. 1, the reaction information acquisition unit 240 is a camera incorporated in a smartphone, and can image the user U while the user U is browsing the screen. Alternatively, the reaction information acquisition unit 240 may be an external camera capable of communicating with the smartphone main body by wireless connection or wired connection. For example, the reaction information acquisition unit 240 may detect the movement of the user (position, posture, movement of limbs, movement of head, and the like), the expression of the face (eyes, eyebrows, mouth movement, and the like), or the line-of-sight using the camera. Alternatively, the reaction information acquisition unit 240 may detect the movement of the user by the IMU, and in this case, the reaction information acquisition unit 240 may be implemented by a device that can be attached to the body of the user or a device that can be gripped by the user. Furthermore, the reaction information acquisition unit 240 may detect the spoken voice of the user by, for example, a microphone. Furthermore, the reaction information acquisition unit 240 may include a plurality of types of sensors.

Note that, in the present embodiment, an example in which sensing data detected by the reaction information acquisition unit 240 is used as information indicating the state or action of the user U will be described, but the present disclosure is not limited to this example. The information indicating the state or action of the user U may be detected from, for example, a button/switch operation of a controller operated by the user, a joystick operation, an inclination operation, or the like. Furthermore, the user reaction information may be input from various operation input units such as a keyboard, a mouse, and a touch pad.

Furthermore, in the present embodiment, the reaction information acquisition unit 240 detects the state or action of the user U at a regular time interval. The regular time interval may be set in advance. For example, the regular time interval may be 20 microseconds. Alternatively, the regular time interval may be dynamically changed during the live distribution according to the situation of the communication path of the distribution server 10 or the state of the information processing load of the information processing device 30.

(Control Unit)

The control unit 260 has a function of analyzing information indicating the state or action of the user U detected by the reaction information acquisition unit 240 and converting the information indicating the state or action of the user U into an information format designated by the information processing device 30. Furthermore, the control unit 260 performs control to cause the communication unit 200 to transmit user reaction information including information indicating the state or action of the user U subjected to the conversion processing to the information processing device 30.

(Storage Unit)

The storage unit 280 is a storage device capable of storing a program and data for operating the control unit 260. Furthermore, the storage unit 280 can also temporarily store various data required in the process of the operation of the control unit 260. For example, the storage device may be a non-volatile storage device.

The configuration of the user terminal 20 has been described above. Note that, the configuration of the user terminal 20 is not limited to the example illustrated in FIG. 3. For example, the user terminal 20 may include a display device having at least sensor functions corresponding to the display unit 220 and the reaction information acquisition unit 240, and a control device including at least the communication unit 200 and the control unit 260.

2-3. Functional Configuration of Information Processing Device 30

Figure 4:
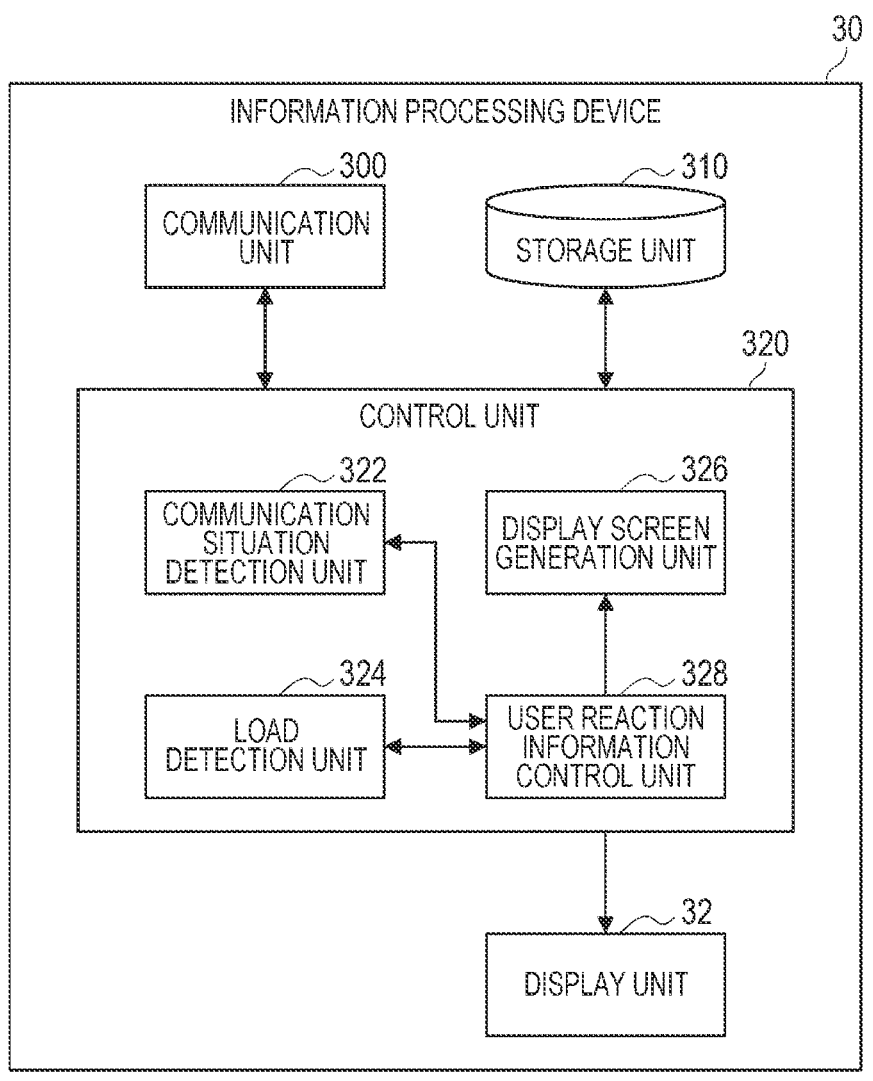
FIG. 4 is an explanatory diagram illustrating a functional configuration example of an information processing device 30 according to the same embodiment.

FIG. 4 is an explanatory diagram illustrating a functional configuration example of the information processing device 30 according to the present embodiment. As illustrated in FIG. 4, the information processing device 30 according to the present embodiment includes a communication unit 300, a storage unit 310, a control unit 320, and a display unit 32.

(Communication Unit)

The communication unit 300 includes a communication interface, and communicates with the distribution server 10 and the user terminal 20 via the network 5. For example, the communication unit 300 receives the user reaction information from each user terminal 20.

(Storage Unit)

The storage unit 310 is a storage device capable of storing a program and data for operating the control unit 320. Furthermore, the storage unit 310 can also temporarily store various data required in the process of the operation of the control unit 320. For example, the storage device may be a nonvolatile storage device. Such a storage unit 310 stores avatar information of each user necessary for generating user information indicating each user displayed on the display unit 32 by the control unit 320.

(Control Unit)

The control unit 320 includes a CPU and the like, and functions thereof can be implemented by the CPU developing a program stored in the storage unit 310 in the RAM and executing the program. At this time, a computer-readable recording medium in which the program is recorded can also be provided. Alternatively, the control unit 320 may be configured by dedicated hardware, or may be configured by a combination of a plurality of pieces of hardware. Such a control unit 320 controls the overall operation in the information processing device 30. For example, the control unit 320 controls communication between the communication unit 300 and the distribution server 10, and communication between the communication unit 300 and the user terminal 20. Furthermore, as illustrated in FIG. 4, the control unit 320 has functions as a communication situation detection unit 322, a load detection unit 324, a display screen generation unit 326, and a user reaction information control unit 328.

The communication situation detection unit 322 has a function of detecting the situation of the communication path between the communication path through which the distribution video information is transmitted from the distribution server 10 to the user terminal 20 and the communication path through which the user reaction information is transmitted from each of the plurality of user terminals 20 viewing the distribution live to the distribution server 10.

As the detection of the situation of the communication path, the communication situation detection unit 322 detects a time difference between the time at which the control unit 320 has acquired the user reaction information from each of the user terminals 20 and the time indicated by the time information included in the distribution video information reproduced on each of the user terminals 20 at the time at which the user reaction information has been transmitted by each of the user terminals 20. The communication situation detection unit 322 provides the detected time difference to the user reaction information control unit 328 as a state of a communication path between each of the user terminals 20, the distribution server 10, and the information processing device 30.

The load detection unit 324 has a function of detecting a situation of the information processing load of the information processing device 30. The load detection unit 324 calculates the CPU usage rate of the control unit 320 as the detection of the situation of the information processing load. Alternatively, the control unit 320 may calculate the memory usage rate as the detection of the situation of the information processing load. The load detection unit 324 provides the detected CPU usage rate to the user reaction information control unit 328 as the situation of the information processing load.

The display screen generation unit 326 has a function of receiving the user reaction information acquired by the user reaction information control unit 328 from the user terminal 20 from the user reaction information control unit 328, generating user information that is information indicating each user, and displaying the generated user information on the display unit 32. For example, in a case where the user reaction information is the whole-body video of the user U, the display screen generation unit 326 adjusts the display size and the display position of the whole-body video, and causes the display unit 32 to display the adjusted whole-body video as the user information. In a case where the user reaction information is action information indicating that a predetermined action is being performed by the user U, the display screen generation unit 326 applies the predetermined action to the action of the avatar, adjusts the display size and the display position of the avatar, and displays the adjusted avatar on the display unit 32 as the user information.

The user reaction information control unit 328 acquires the user reaction information from the user terminal 20 via the communication unit 300, and provides the user reaction information to the display screen generation unit 326. Furthermore, the user reaction information control unit 328 acquires performer action information from the distribution server 10 via the communication unit 300. The user reaction information control unit 328 performs information control to cause the user terminal 20 to change information to be transmitted as the user reaction information by the user terminal 20 on the basis of at least one of the user reaction information, the performer action information, a situation of the communication path, or a situation of the information processing load. The user reaction information control unit 328 performs the information control, whereby the total amount of the user reaction information transmitted from the user terminal 20 to the information processing device 30 can be dynamically controlled.

(Display Unit)

The display unit 32 has a function of displaying various types of information under the control of the control unit 320. For example, the display unit 32 can display the user information generated by the display screen generation unit 326. Here, the form of the display unit 32 may be, for example, a liquid crystal display device or an OLED device. With this configuration, the performer P1 can perform a performance while confirming the reaction of the user U viewing the distribution live by the whole-body video or the video such as the avatar.

The configuration of the information processing device 30 has been described above. Note that, the configuration of the information processing device 30 is not limited to the example illustrated in FIG. 4. For example, the information processing device 30 may include a display device corresponding to the display unit 32, and a control device including at least the communication unit 300 and the control unit 320.

Furthermore, in the present embodiment, the method has been described in which, as the detection of the situation of the communication path, the communication situation detection unit 322 detects the time difference between the time at which the control unit 320 has acquired the user reaction information from each of the user terminals 20 and the time indicated by the time information of the distribution video information reproduced on each of the user terminals at the time at which the user reaction information has been transmitted by each of the user terminals, but the method of detecting the situation of the communication path may be another method. For example, the method of detecting the situation of the communication path may be a method of calculating the band usage rate of the communication path.

3. DESCRIPTION OF OPERATION PROCESSING EXAMPLE ACCORDING TO PRESENT EMBODIMENT

Next, an operation example of the information processing system 1 according to the present embodiment will be described. As described above, the user reaction information control unit 328 of the information processing device 30 according to the present embodiment performs information control to cause the user terminal 20 to change information to be transmitted as the user reaction information by the user terminal 20 on the basis of at least one or more of the user reaction information, the performer action information, the situation of the communication path, or the situation of the information processing load. The user reaction information control unit 328 may perform only one of the information control based on the user reaction information, the information control based on the performer action information, the information control based on the situation of the communication path, and the information control based on the situation of the information processing load, or may perform control by combining two or more information controls. Hereinafter, operation examples in which the above-described four information controls are performed by the user reaction information control unit 328 of the information processing device 30 in the information processing system 1 will be sequentially described.

3-1. Operation Example 1

First, as Operation Example 1, an operation example in a case where the user reaction information control unit 328 performs information control on the basis of the user reaction information will be described. In the present operation example, the reaction information acquisition unit 240 of the user terminal 20 detects the state and action of the user U by imaging the whole body including the face of the user U. Furthermore, the control unit 260 analyzes the emotion of the user U and the movement of each part of the body from the video of the whole body including the face of the user U, and transmits the analysis result to the information processing device 30 as the user reaction information. The display screen generation unit 326 of the information processing device 30 generates user information to be displayed on the display unit 32 as an avatar representing each user on the basis of the user reaction information. The display screen generation unit 326 performs drawing control on the basis of the user reaction information such that the avatar representing each user indicates the facial expression indicating the same emotion as each user and the movement of each part of the same body as each user.

In general, in a music live show, a majority of audiences may perform determined actions such as applauding, waving a hand, jumping, waving (waving a hand at the same timing as other audiences), shaking a head, and waving a towel in a specific scene. In a case where such information of the determined action is acquired as the user reaction information, the user reaction information can be indicated by binary information indicating whether each user is performing or not performing each act corresponding to the determined action.

Furthermore, in general, there are a case where the audience spontaneously performs the determined action as described above in the music live show and a case where the audience performs the action according to a call or a gesture of the performer. Furthermore, depending on the music that the performer performs a performance, there is a case in which the type of the determined action as described above is determined as the standard action. Therefore, as the reaction that can be shown by the user U in the music live show, it is possible to assume in advance the determined action as described above. Note that, the above-described determined action that can be shown by the user U is not limited to the above-described example, and may include other operations.

The inventor of the present disclosure has created the present operation example by focusing on the above circumstances. In the present operation example, the type of the determined action as described above is assumed and set as the predetermined reaction that can be shown by the user U. The predetermined reaction may be set by an operator of the information processing device 30. The user reaction information control unit 328 of the information processing device 30 determines whether or not the user U shows the predetermined reaction on the basis of whether or not predetermined reaction information indicating whether or not the user U shows the predetermined reaction is included in the user reaction information. The user reaction information control unit 328 performs information control to cause the user terminal 20 to change information to be transmitted as the user reaction information by the user terminal 20 on the basis of the determination result. In a case where the predetermined reaction information is included in the user reaction information, the user reaction information control unit 328 performs the information control so that the total amount of information to be transmitted as the user reaction information by the user terminal 20 is reduced. Furthermore, in a case where it is determined that the predetermined reaction information is not included in the user reaction information after performing the information control, the user reaction information control unit 328 performs information control of increasing the total amount of information transmitted by the user terminal 20 as the user reaction information. Such information control by the information processing device 30 can also be rephrased as information control in which the user reaction information control unit 328 causes the user terminal 20 to transmit second user reaction information having an information amount different from that of the first user reaction information when the information processing device 30 sets the user reaction information received from the user terminal 20 at a certain time point of time as the first user reaction information. Hereinafter, such Operation Example 1 will be sequentially described in detail.

First, a user specific reaction table used for the operation of the user reaction information control unit 328 in the present operation example will be described. The storage unit 310 of the information processing device 30 in the present operation example stores a user identification reaction table including the predetermined reaction and user reaction information. In a case where the predetermined reaction information is included in the user reaction information transmitted from the user terminal 20 to the information processing device 30, the user reaction information control unit 328 causes the user terminal 20 to transmit, as the user reaction information, information associated with a predetermined reaction indicated by the predetermined reaction information in the user identification reaction table.

FIG. 5 is an explanatory diagram illustrating a specific example of a user specific reaction table T1 stored in the storage unit 310. As illustrated in FIG. 5, in the user specific reaction table T1, a reaction information ID, a predetermined reaction of the user, user reaction information to be transmitted, and an information amount are associated with each other.

The reaction information ID is information given to identify an action set for a predetermined reaction of the user. In the example illustrated in FIG. 5, serial numbers 1 to 8 are assigned. Alternatively, the reaction information ID may be in other forms such as a symbol or an alphabet.

The predetermined reaction of the user indicates a reaction that can be shown by the user U and is assumed in advance as the determined action. In the example illustrated in FIG. 5, "waving an arm", "waving a towel", "swinging a body (dancing)", "jumping", "applauding", "shaking a head", "waving", and "shaking a light" are set as predetermined reactions of the user. The predetermined reaction of the user is not limited to the example illustrated in FIG. 5, and may be other assumed contents. Furthermore, the number of types of information set for the predetermined reaction of the user may be any number.

The user reaction information to be transmitted is information indicating what information the user reaction information control unit 328 causes the user terminal 20 to transmit as the user reaction information in a case where any of the predetermined reactions of the user is shown by the user. In the example illustrated in FIG. 5, "angular velocity of a hand", "waving/not waving a towel", "swinging/not swinging a body", "jumping/not jumping", "applauding/not applauding", "shaking a head/not shaking a head", "waving/not waving", and "shaking a light/not shaking a light" are set. In the example illustrated in FIG. 5, among the information set as the user reaction information to be transmitted, information described by being separated by a slash, such as "waving/not waving a towel", indicates that whether or not the corresponding action is being performed is binary information represented by 0 or 1.

The information amount indicates an information amount for each user reaction information to be transmitted. In the example illustrated in FIG. 5, all the user reaction information to be transmitted of the reaction information IDs 1 to 8 indicates 1 byte as the information amount. Therefore, it is understood that the predetermined reaction "waving an arm" of the user whose reaction information ID is 1 is associated with the "angular velocity of a hand" as the user reaction information to be transmitted, and the information amount of the "angular velocity of a hand" is 1 byte.

The user specific reaction table used for the operation of the user reaction information control unit 328 in the present operation example has been described above. Subsequently, the operation of the information processing system 1 in the present operation example will be sequentially described with reference to FIG. 6.

Figure 6:
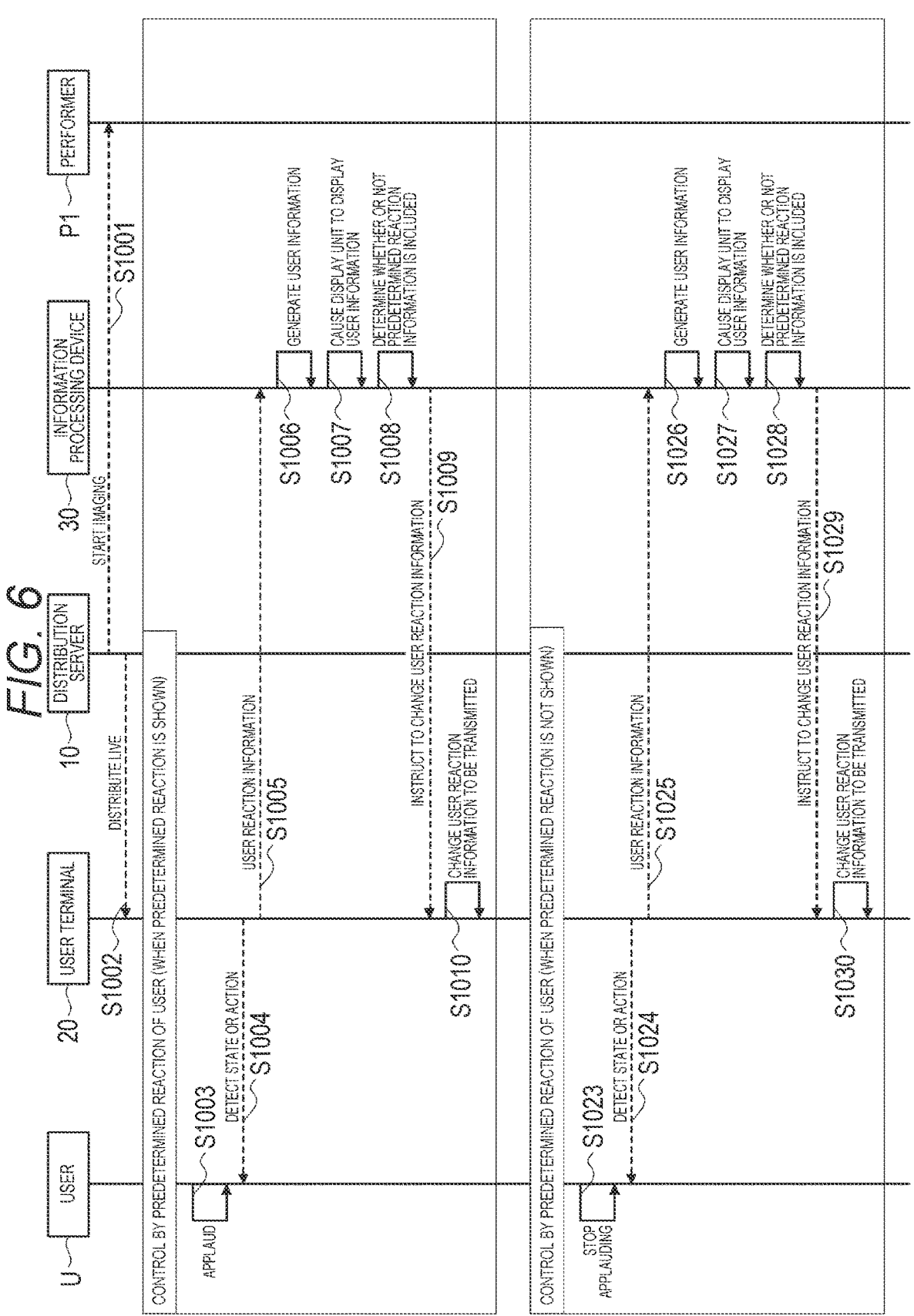
FIG. 6 is a sequence diagram illustrating a flow of Operation Example 1 of the information processing system 1 according to the same embodiment.

FIG. 6 is a sequence diagram illustrating a flow of Operation Example 1 of the information processing system 1 according to the present embodiment. As illustrated in FIG. 6, when the live distribution is started, first, the imaging unit 12 of the distribution server 10 starts imaging of the performer P1 (S1001). The video acquisition unit 110 of the distribution server 10 receives the video of the performer P1 from the imaging unit 12, and distributes the distribution video information to the user terminal 20 via the communication unit 120 (S1002).

Thereafter, in a case where the user U applauds as a predetermined reaction while viewing the distributed video on the user terminal 20 (S1003), the processing of S1004 to S1010 is performed. Specifically, the reaction information acquisition unit 240 of the user terminal 20 detects information indicating the state or action of the user U viewing the live distribution on the user terminal (S1004).

The control unit 260 of the user terminal 20 receives and analyzes the information indicating the state or action of the user U detected by the reaction information acquisition unit 240, and performs processing of converting the information indicating the state or action of the user U into the information format designated by the information processing device 30. Therefore, in the state where the live distribution is started, the information indicating the expression of the user U and the movement of each part of the body is designated as the initial value of the information format.

Furthermore, the control unit 260 transmits the information indicating the state or action of the user U subjected to the conversion processing to the information processing device 30 as user reaction information (S1005). In the present operation example, information of the emotion of the user U and the movement of each part of the body is transmitted as the user reaction information. The information of the movement of each part of the body includes information of the angular velocity of a hand as information indicating that the user U is applauding.

The display screen generation unit 326 of the information processing device 30 generates user information indicating the user U on the basis of the user reaction information acquired from the user terminal 20 (S1006). In the present operation example, the display screen generation unit 326 performs the drawing control of the avatar indicating the same emotion or movement as the user U as the user information indicating the user U on the basis of the user reaction information. The display screen generation unit 326 causes the display unit 32 to display the generated user information (S1007).

Next, the user reaction information control unit 328 analyzes the user reaction information, and determines whether or not predetermined reaction information is included in the user reaction information (S1008). When determining that the user reaction information includes the predetermined reaction information, the user reaction information control unit 328 specifies the predetermined reaction indicated by the user reaction information and the corresponding "user reaction information to be transmitted" on the basis of the user specific reaction table T1 stored in the storage unit 310. In the present operation example, the user reaction information control unit 328 determines that the user U performs an action of "applauding" which is a predetermined reaction on the basis of the user reaction information. Furthermore, the user reaction information control unit 328 recognizes that the user reaction information to be transmitted corresponding to the action of "applauding" is information of 1 byte indicating either "applauding" or "not applauding" on the basis of the user specific reaction table T1.

The user reaction information control unit 328 issues, to the user terminal 20, an instruction to change the information to be transmitted as the user reaction information by the user terminal 20 to information indicating either "applauding" or "not applauding" on the basis of the determination result (S1009). Upon receiving the above instruction, the user terminal 20 changes the user reaction information to be transmitted as the user reaction information of the user U to information indicating either "applauding" or "not applauding" (S1010).

Figure 7:
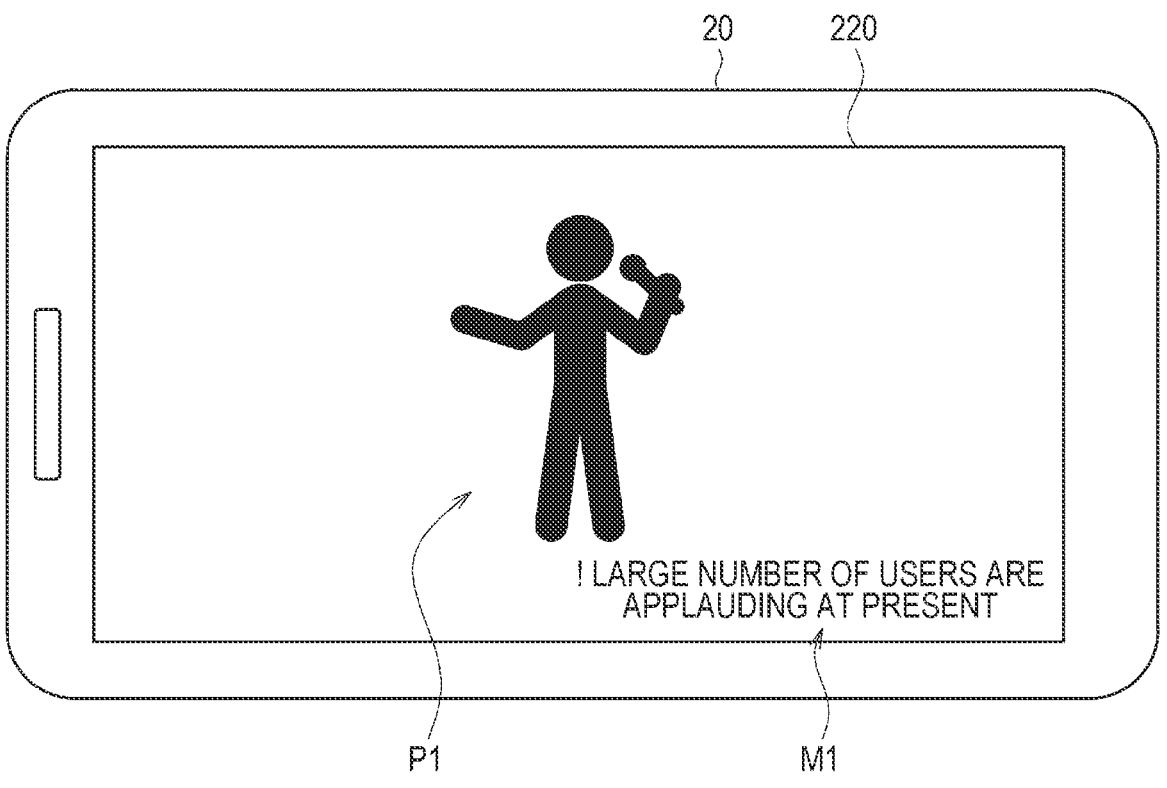
FIG. 7 is an example of a screen displayed on a display unit 220 according to the same embodiment.

At this time, in a case where the user reaction information indicating the same predetermined reaction exceeds a certain ratio among the user reaction information received from the user terminal 20 used by the user U viewing the live distribution, the user reaction information control unit may notify all the user terminals 20 that the user indicating the predetermined reaction exceeds the certain ratio. FIG. 7 is an example of a screen in a case where the notification is made to the user terminal 20. In the example illustrated in FIG. 7, the distribution video information is displayed on the display unit 220 of the user terminal 20, and the performer P1 appears in the distribution video information. Furthermore, a notification M1 of "a large number of users are applauding at present" is displayed at the lower right of the distribution video information. In general, it is assumed that a user who has participated in a music live show a plurality of times knows the standard action or the determined action as described above. On the other hand, there is a case where a user who has little experience of participating in a music live show does not know a standard action or a determined action and performs an operation different from other users. As illustrated in FIG. 7, by performing the notification M1, even a user having little experience of participating in a music live show can know a standard action or a determined action. Furthermore, by knowing that the users who are viewing the same live distribution the same reaction, it is possible to obtain a sense of unity that the users are participating in the live show.

As described above, when determining that the user U shows a reaction of "applauding", the user reaction information control unit 328 performs information control to cause the user terminal 20 to change the user reaction information to be transmitted by the user terminal 20 to information indicating either "applauding" or "not applauding". With this configuration, while the user U shows a predetermined reaction, the user terminal 20 transmits only information indicating whether or not the predetermined reaction is shown as the user reaction information. Meanwhile, on the basis of the user reaction information, the display screen generation unit 326 performs drawing control such that the avatar indicating the user applauds, and causes the display unit 32 to display the drawing control. Therefore, while the user U shows a predetermined reaction, the total amount of the user reaction information transmitted from the user terminal 20 can be reduced. Furthermore, even while the total amount of the user reaction information is being reduced, the reaction of the user viewing the live distribution can be conveyed to the performer P1.

Thereafter, in a case where the user U stops applauding (S1023), the processing of S1024 to S1030 is performed. Specifically, the reaction information acquisition unit 240 of the user terminal 20 detects information indicating the state or action of the user U (S1023). In the present operation example, it is detected that the user U is not applauding.

The control unit 260 of the user terminal 20 receives and analyzes the information indicating the state or action of the user U detected by the reaction information acquisition unit 240, and performs processing of converting the information indicating the state or action of the user U into the information format designated by the information processing device 30. In the present operation example, in S1010, the user terminal 20 changes the user reaction information to be transmitted to "applauding" or "not applauding" according to the instruction from the information processing device 30. Therefore, the control unit 260 performs processing of converting the information indicating the state or action of the user U into information indicating "not applauding" on the basis of the result of the analysis.

The control unit 260 transmits at least one of the information indicating the state or action of the user U or the information indicating the state or action of the user U subjected to the conversion processing to the information processing device 30 as the user reaction information (S1025). In the present operation example, information indicating "not applauding" is transmitted as the user reaction information.

Next, the display screen generation unit 326 of the information processing device 30 generates user information indicating the user U on the basis of the user reaction information acquired from the user terminal 20 (S1026). Further, the display screen generation unit 326 causes the display unit 32 to display the generated user information (S1027). In the present operation example, the display screen generation unit 326 performs drawing control to stop applause of the avatar representing the user U, and updates the display of the avatar displayed on the display unit 32.

Next, the user reaction information control unit 328 determines whether or not predetermined reaction information is included in the user reaction information (S1008).

The user reaction information control unit 328 issues, to the user terminal 20, an instruction to change the information to be transmitted as the user reaction information by the user terminal 20 to information indicating the expression of the user U and the movement of each part of the body on the basis of the result of the determination (S1029). Upon receiving the above instruction, the user terminal 20 changes the user reaction information to be transmitted as the user reaction information of the user U to information indicating the emotion of the user U and the movement of each part of the body (S1030).

As described above, when determining that the predetermined reaction information is not included in the user reaction information, the user reaction information control unit 328 causes the user terminal 20 to change the user reaction information to be transmitted by the user terminal 20 to information indicating the expression of the user U and the movement of each part of the body. With this configuration, while the user U does not show a predetermined reaction, reactions other than the determined action as described above that can be taken by the user can also be reflected in the user information.

As Operation Example 1 of the information processing system 1 according to the present embodiment, the flow of the operation in a case where the user reaction information control unit 328 of the information processing device 30 performs the information control on the basis of the user reaction information has been described above. By performing the information control as described above by the information processing device 30, it is possible to dynamically control the total amount of the user reaction information gathered in the information processing device 30 while conveying the reaction shown by the user to the performer in the bidirectional live distribution.

3-2. Operation Example 2

Next, as Operation Example 2 according to the present embodiment, an operation example in a case where the user reaction information control unit 328 performs information control on the basis of the performer action information will be described. As described in Operation Example 1, this operation example is an operation example particularly effective in a case where the audience of the music live show performs the determined action as described above in accordance with a call or a gesture of the performer.

Figure 8:
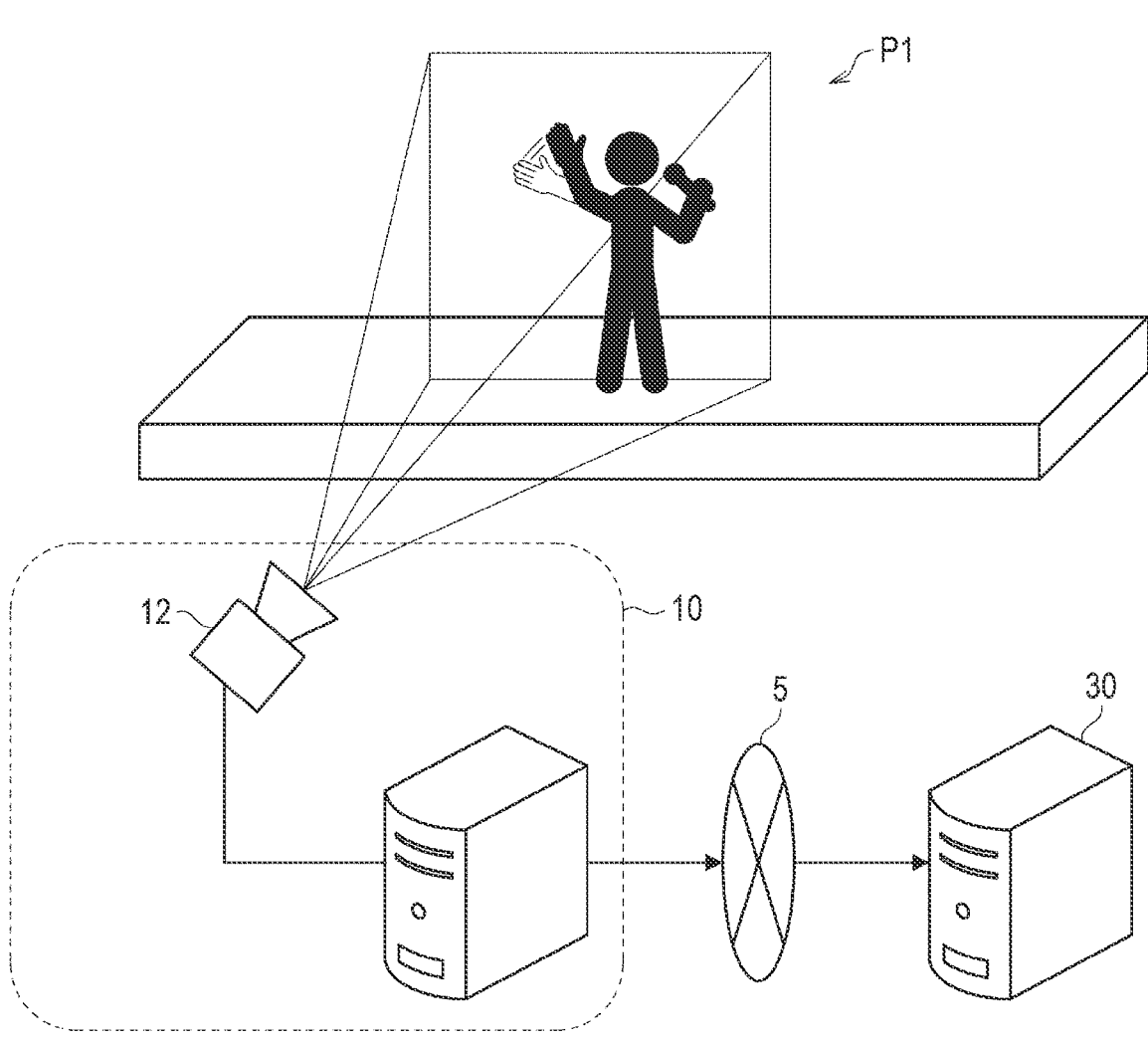
FIG. 8 is a conceptual diagram illustrating Operation Example 2 of the information processing system 1 according to the same embodiment.

FIG. 8 is a conceptual diagram illustrating the present operation example. The conceptual diagram illustrated in FIG. 8 includes the performer P1, the imaging unit 12, the distribution server 10, the imaging unit 12, the network 5, and the information processing device 30. In the present operation example, the performer action detection unit 140 of the distribution server 10 analyzes the video of the performer P1 acquired from the imaging unit 12 to generate the performer action information. The performer action detection unit 140 detects the action of the performer P1 and determines whether or not the performer P1 shows a predetermined action. The control unit 150 generates action flag information indicating whether or not the information indicating the action of the performer P1 is a predetermined action on the basis of the determination result. Furthermore, the control unit 150 acquires action information ID indicating the type of the predetermined action. The control unit 150 adds the action flag information and the action information ID to the performer action information, and transmits the performer action information to the information processing device 30. The user reaction information control unit 328 of the information processing device 30 determines whether or not predetermined action information is included in the performer action information on the basis of the action flag information. The information processing device 30 performs information control to cause the user terminal 20 to change information to be transmitted as the user reaction information by the user terminal 20 on the basis of the determination result.

In the present operation example, in a case where the predetermined action information is included in the performer action information, the user reaction information control unit 328 performs the information control so that the total amount of information to be transmitted as the user reaction information by the user terminal 20 is reduced. Furthermore, in a case where the predetermined action information is not included in the performer action information, the user reaction information control unit 328 performs the information control so that the total amount of information transmitted by the user terminal 20 as the user reaction information increases. Such information control by the information processing device 30 can also be rephrased as information control in which the user reaction information control unit 328 causes the user terminal 20 to transmit the second user reaction information having an information amount different from that of the first user reaction information on the basis of the performer action information when the user reaction information received by the information processing device 30 from the user terminal 20 at a certain time point of time is set as the first user reaction information.

Furthermore, in the present operation example, similarly to Operation Example 1, the display screen generation unit 326 generates user information indicating each user as an avatar representing each user. The display screen generation unit 326 performs drawing control on the basis of the user reaction information including the information indicating the state and action of the user U such that the avatar representing each user shows the facial expression indicating the same emotion as each user and the movement of each part of the same body as each user.

First, a performer specification action table used for the operation of the user reaction information control unit 328 in the present operation example will be described. The storage unit 310 of the information processing device 30 in the present operation example stores the performer specification action table including the predetermined action and the user reaction information. In a case where it is determined that the performer P1 has indicated any predetermined action, the user reaction information control unit 328 causes the user terminal 20 to transmit information associated with the predetermined action in the performer specification action table to as the user reaction information.

FIG. 9 is a specific example of a performer specification action table T2 stored in the storage unit 310. As illustrated in FIG. 9, in the performer specification action table T2, information of the action information ID, the predetermined action of the performer, the user reaction information to be transmitted, and the information amount is associated.

The action information ID is information given to identify an action set to a predetermined action of the performer. In the example illustrated in FIG. 9, serial numbers 1 to 4 are assigned. Alternatively, the reaction information ID may be in other forms such as a symbol or an alphabet.

As described above, the predetermined action of the performer is information of the action of the performer performed in a case where the performer requests the determined action as described above from the audience in the music live show. In the example illustrated in FIG. 9, "waving a hand", "waving a towel", "wave request", and "applauding" are set. The predetermined action of the performer may be determined in advance by the performer P1, an operator of the distribution server 10, or an operator of the information processing device 30, and may be set by an operator of the distribution server 10 or the information processing device 30 in accordance with the determined content. The predetermined action of the performer is not limited to the example illustrated in FIG. 9, and may have other contents. Furthermore, the number of types of information set to the predetermined action of the performer is not limited to four, and may be any type.

The user reaction information to be transmitted is information indicating what information the user reaction information control unit 328 causes the user terminal 20 to transmit as the user reaction information in a case where the action set to the predetermined action of the performer is indicated by the performer. In the example illustrated in FIG. 9, "angular velocity of a hand", "rotation speed of a hand", "waving/not waving", and "applauding/not applauding" are set. In the example illustrated in FIG. 9, among the above information set as the user reaction information to be transmitted, information described by being separated by a slash, such as "waving/not waving", indicates that whether or not the corresponding operation is performed is binary information represented by 0 or 1.

The information amount indicates an information amount for each user reaction information to be transmitted. In the example illustrated in FIG. 9, all the user reaction information to be transmitted of the action information IDs 1 to 4 indicates 1 byte as the information amount. Therefore, it is understood that the predetermined reaction "waving a hand" of the user whose action information ID is 1 is associated with the "angular velocity of a hand" as the user reaction information to be transmitted, and the information amount of the "angular velocity of a hand" is 1 byte.

The performer specification action table T2 used for the operation of the user reaction information control unit 328 in the present operation example has been described above. Subsequently, the operation of the information processing system 1 in the present operation example will be sequentially described with reference to FIG. 10.

Figure 10:
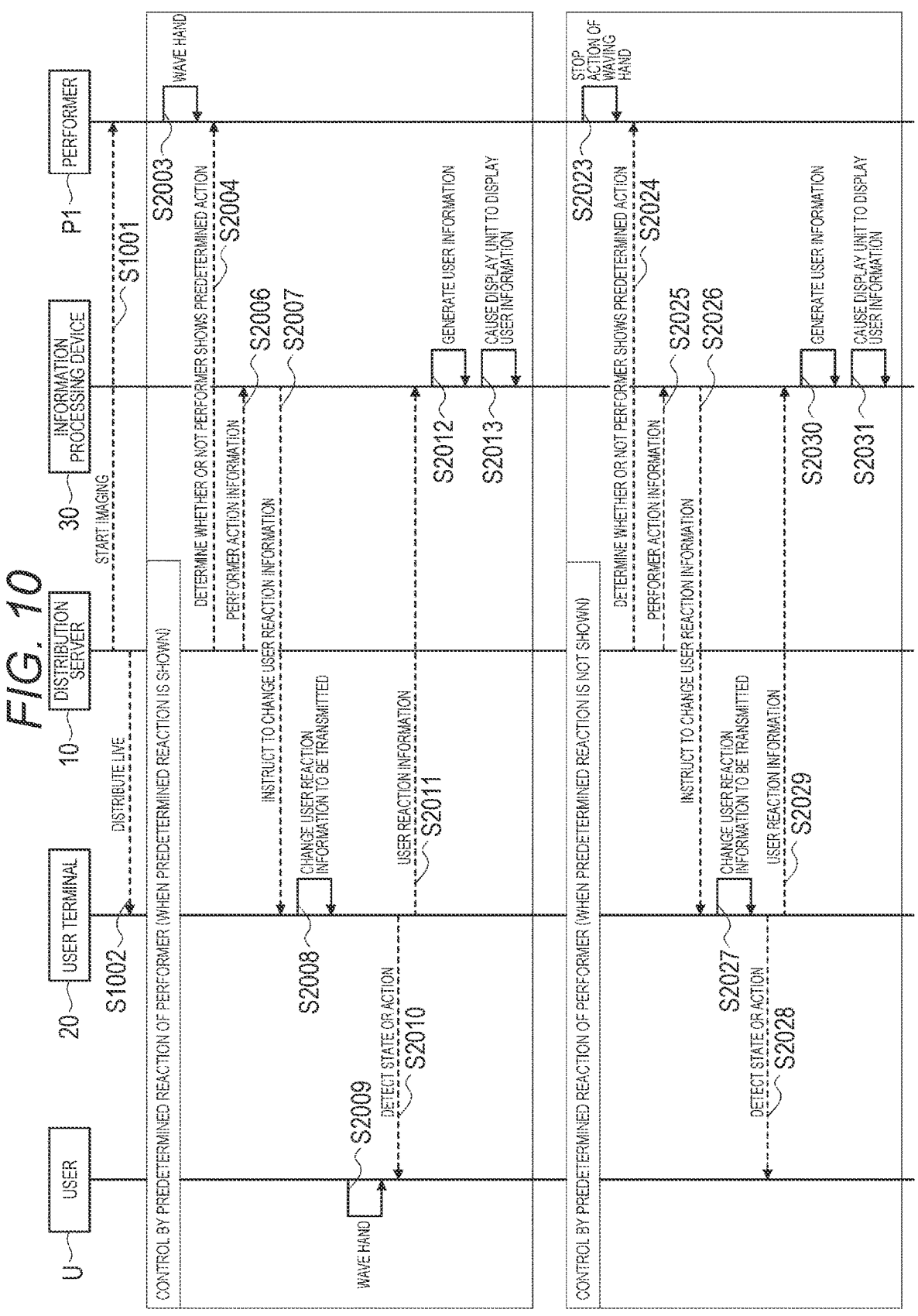
FIG. 10 is a sequence diagram illustrating a flow of Operation Example 2 of the information processing system 1 according to the same embodiment.

FIG. 10 is a sequence diagram illustrating a flow of Operation Example 2 of the information processing system 1 according to the present embodiment. Note that, among the processing included in the sequence diagram illustrated in FIG. 10, the processing of S1001 and S1002 is as described in Operation Example 1, and thus the detailed description thereof will be omitted here.

As illustrated in FIG. 10, when the live distribution is started, the processing of S1001 and S1002 is performed similarly to Operation Example 1. Furthermore, similarly to Operation Example 1, in a state where the live distribution is started, information indicating the expression of the user U and the movement of each part of the body is designated as an initial value of an information format of information to be transmitted as the user reaction information by the user terminal 20.

Thereafter, in a case where the performer P1 waves a hand as a predetermined action (S2003), the processing of S2004 to S2013 is performed. Specifically, the performer action detection unit 140 of the distribution server 10 analyzes the video of the performer P1 acquired from the imaging unit 12 and generates the performer action information. The performer action detection unit 140 determines whether or not predetermined action information is included in the performer action information (S2004). At this time, the storage unit 130 of the distribution server 10 may store the performer specifying action list including at least the action information ID included in the performer specification action table T2 and the same contents as the predetermined action of the performer. The performer action detection unit 140 may make the determination on the basis of the performer specifying action list. In the present operation example, the performer action detection unit determines that the performer P1 is waving a hand.

The performer action detection unit 140 generates action flag information indicating whether or not the information indicating the action of the performer P1 includes a predetermined action on the basis of the result of the determination. For example, the action flag information may be set to 1 in a case where the predetermined action information is included in the performer action information, and may be set to 0 in a case where the predetermined action information is not included in the performer action information, and may be in other formats such as an alphabet or a symbol.

Furthermore, the performer action detection unit 140 refers to the performer specifying action list, and acquires the action information ID corresponding to the predetermined action indicated by the performer action information. The performer action detection unit 140 adds the flag information and the action information ID to the performer action information and passes the performer action information to the control unit 150. The control unit 150 causes the communication unit 120 to transmit the performer action information to the information processing device 30 (S2006). In the present operation example, the performer action detection unit 140 adds "1" as the action flag information and "1" as the action information ID to the performer action information and passes the performer action information to the control unit 150. The control unit 150 causes the communication unit 120 to transmit the received performer action information to the information processing device 30.

The user reaction information control unit 328 of the information processing device 30 determines whether or not predetermined action information is included in the performer action information received from the distribution server 10. More specifically, the user reaction information control unit 328 determines that the performer action information includes predetermined action information by the action flag information included in the performer action information. The user reaction information control unit 328 holds the received action flag information in the storage unit 310 until it is determined that the predetermined action information is not included in the performer action information received from the distribution server 10. Furthermore, in a case where predetermined action information is included in the performer action information, the user reaction information control unit 328 refers to the performer specification action table T2 stored in the storage unit 310 on the basis of the action information ID included in the performer action information, and specifies the "predetermined action of a performer" indicated by the performer action information and the corresponding "user reaction information to be transmitted". In the present operation example, the user reaction information control unit 328 specifies, on the basis of the performer specification action table T2, that the predetermined action indicated by the performer action information is the action of "waving a hand", the user reaction information to be transmitted corresponding to the action of "waving a hand" is the "angular velocity of a hand", and the "angular velocity of a hand" is information of 1 byte.

The user reaction information control unit 328 of the information processing device 30 issues, to the user terminal 20, an instruction to change the information to be transmitted as the user reaction information by the user terminal 20 to the information indicating the angular velocity of the hand of the user U on the basis of the determination result (S2007). Upon receiving the above instruction, the user terminal 20 changes the information to be transmitted as the user reaction information of the user U to information indicating the angular velocity of the hand of the user U (S2008).

Next, when the user U viewing the live distribution on the user terminal 20 shows an action of waving a hand (S2009), the reaction information acquisition unit 240 of the user terminal 20 detects information indicating a state or action of the user U (S2010).

The control unit 260 of the user terminal 20 receives and analyzes the information indicating the state or action of the user U detected by the reaction information acquisition unit 240, and performs processing of converting the information indicating the state or action of the user U into the information format designated by the information processing device 30. In the present operation example, in S2007, the user terminal 20 changes the user reaction information to be transmitted to the "angular velocity of a hand" according to the instruction from the information processing device 30. Therefore, the control unit 260 performs processing of converting the information indicating the state or action of the user U into information indicating information of the "angular velocity of a hand" on the basis of the result of the analysis.

The control unit 260 transmits at least one of the information indicating the state or action of the user U or the information indicating the state or action of the user U subjected to the conversion processing to the information processing device 30 as the user reaction information (S2011). In the present operation example, information indicating the "angular velocity of a hand" of the user U is transmitted as the information indicating the state or action of the user U.

Next, the display screen generation unit 326 of the information processing device 30 generates user information indicating the user U on the basis of the user reaction information acquired from the user terminal 20 (S2012). Further, the display screen generation unit 326 causes the display unit 32 to display the generated user information (S2013). In the present operation example, the display screen generation unit 326 performs drawing control to cause the avatar representing the user U to perform an action of waving a hand, and updates the display of the avatar displayed on the display unit 32.

As described above, when it is determined that the performer P1 shows the action of "waving a hand" which is the predetermined action set in advance, the user reaction information control unit 328 performs information control to cause the user terminal 20 to change the user reaction information to be transmitted by the user terminal 20 to information indicating the "angular velocity of a hand" which is information indicating the action of "waving a hand". With this configuration, while the performer P1 shows a predetermined action, the user terminal 20 transmits only information indicating whether or not a reaction corresponding to the predetermined action is shown as the user reaction information. Meanwhile, on the basis of the user reaction information, the display screen generation unit 326 performs drawing control such that the avatar indicating the user shows an action of waving a hand, and causes the display unit 32 to display the drawing control. Therefore, while the performer P1 shows a predetermined action, the total amount of the user reaction information transmitted from the user terminal 20 can be reduced. Furthermore, even while the total amount of the user reaction information is being reduced, the reaction of the user viewing the live distribution can be conveyed to the performer P1.

Furthermore, with the configuration as described above, the fact that the user U reacts to the action of the performer P1 and the user U shows the same action as the performer P1 is conveyed to the performer P1, whereby the performer P1 can more easily feel the sense of unity of the live. Furthermore, in addition to the above configuration, the imaging unit 12 may image the performer P1 at an angle of view at which the performer P1 and at least part of the user information displayed on the display unit 32 appear. In that case, the user viewing the live distribution can grasp that the performer P1 and users other than the user himself/herself show the same action as the user himself/herself, and the sense of unity of the live is more easily felt.

Thereafter, in a case where the performer P1 stops the action of waving a hand (S2023), the processing of S2024 to S2031 is performed. Specifically, the performer action detection unit 140 of the distribution server 10 analyzes the video of the performer P1 acquired from the imaging unit 12 and generates the performer action information. The performer action detection unit 140 refers to the performer specifying action list stored in the storage unit 130, and determines whether or not predetermined action information is included in the generated performer action information (S2024). In the present operation example, it is determined that the performer P1 has stopped the action of waving a hand.

The performer action detection unit 140 generates the action flag information on the basis of the determination result. The performer action detection unit 140 adds the flag information to the performer action information and passes the performer action information to the control unit 150. The control unit 150 causes the communication unit 120 to transmit the performer action information to the information processing device 30 (S2006). In the present operation example, the performer action detection unit 140 adds "0" to the performer action information as the action flag information, and passes the performer action information to the control unit 150. The control unit 150 causes the communication unit 120 to transmit the received performer action information to the information processing device 30 (S2025).

The user reaction information control unit 328 of the information processing device 30 determines whether or not the performer action information received from the distribution server 10 includes predetermined action information on the basis of the action flag information included in the performer action information. In a case where it is determined that the performer action information is not information indicating a predetermined action because the action flag information is "0", the user reaction information control unit 328 changes the action flag information held in the storage unit 310 from "1" to "0".

The user reaction information control unit 328 issues, to the user terminal 20, an instruction to change the information to be transmitted as the user reaction information by the user terminal 20 to information indicating the expression of the user U and the movement of each part of the body on the basis of the result of the determination (S2026). Upon receiving the above instruction, the control unit 260 of the user terminal 20 changes the user reaction information to be transmitted to information indicating the expression of the user U and the movement of each part of the body (S2027).

The reaction information acquisition unit 240 of the user terminal 20 detects information indicating the state or action of the user U (S2028). The control unit 260 of the user terminal 20 receives and analyzes the information indicating the state or action of the user U detected by the reaction information acquisition unit 240, and performs processing of converting the information indicating the state or action of the user U into the information format designated by the information processing device 30. In the present operation example, in S2027, the user terminal 20 changes the user reaction information to be transmitted to information indicating the expression of the user U and the movement of each part of the body according to the instruction from the information processing device 30. Therefore, the control unit 260 performs conversion processing on the information indicating the state or action of the user U into information indicating the expression of the user U and the movement of each part of the body on the basis of the result of the analysis.

The control unit 260 transmits the information indicating the state or action of the user U subjected to the conversion processing to the information processing device 30 as user reaction information (S2029). In the present operation example, information indicating the expression of the user U and the movement of each part of the body is transmitted as the user reaction information.

Next, the display screen generation unit 326 of the information processing device 30 generates user information indicating the user U on the basis of the user reaction information acquired from the user terminal 20 (S2030). Further, the display screen generation unit 326 causes the display unit 32 to display the generated user information (S2031). In the present operation example, the display screen generation unit 326 performs drawing control to apply the expression of the user U and the movement of each part of the body indicated by the user reaction information to the avatar representing the user U, and updates the display of the avatar displayed on the display unit 32.

As described above, when determining that the performer P1 no longer shows the predetermined action, the user reaction information control unit 328 causes the user terminal 20 to change the user reaction information to be transmitted by the user terminal 20 to information indicating the expression of the user U and the movement of each part of the body. With this configuration, while the performer P1 does not show the predetermined action, reactions other than the determined action as described above that can be taken by the user can also be reflected in the user information.

As Operation Example 2 of the information processing system 1 according to the present embodiment, the flow of the operation in a case where the user reaction information control unit 328 of the information processing device 30 performs the information control on the basis of the performer action information has been described above. By performing the information control as described above by the information processing device 30, it is possible to dynamically control the total amount of the user reaction information gathered in the information processing device 30 while conveying the reaction shown by the user to the performer in the bidirectional live distribution.

3-3. Operation Example 3

Subsequently, as Operation Example 3 according to the present embodiment, an operation example in a case where the user reaction information control unit 328 performs information control on the basis of the situation of the communication path will be described. In the present operation example, the total amount of information transmitted as the user reaction information by the user terminal 20 is dynamically controlled according to the situation of the communication path between the distribution server 10 and the user terminal 20 and the communication path between the user terminal 20 and the information processing device 30.

The communication situation detection unit 322 of the information processing device 30 calculates a time difference between the time at which the control unit 320 has acquired the user reaction information from each of the user terminals 20 and the time indicated by the time information included in the distribution video information reproduced on each of the user terminals 20 at the time at which the user reaction information has been transmitted by each of the user terminals 20. In the present operation example, the user reaction information control unit 328 acquires the time difference as information indicating the situation of the communication path from the communication situation detection unit 322, and compares the time difference with a preset reference. The content of the reference is set in advance in the communication situation reference table stored in the storage unit 310. The user reaction information control unit 328 compares the time difference with the reference on the basis of the communication situation reference table, and selects a section of the target user terminal 20 in which the communication situation is detected on the basis of the comparison result. Further, the user reaction information control unit 328 refers to the section table stored in the storage unit 310 and confirms the user reaction information corresponding to the selected section. The user reaction information control unit 328 performs information control of issuing an instruction to change the information to be transmitted as the user reaction information to user reaction information corresponding to the section to the target user terminal 20. Hereinafter, such Operation Example 3 will be sequentially described in detail.

First, the communication situation reference table used for the operation of the user reaction information control unit 328 in the present operation example will be described. The user reaction information control unit 328 refers to a reference set in advance in the communication situation reference table, and compares the time difference with the reference. FIG. 11 is a specific example of a communication situation reference table T3 stored in the storage unit 310. As illustrated in FIG. 11, in the communication situation reference table T3, the reference and the section are associated with each other. x represents the time difference.

The reference is information indicating a conditional expression for the user reaction information control unit 328 to compare a reference value for detecting the communication situation on the basis of the time difference with the reference value. In the example illustrated in FIG. 11, 3 seconds and 5 seconds are set as reference values. In addition, three types of $x<3$ seconds, $3$ seconds$\leq x<5$ seconds, and $5$ seconds$\leq x$ are set as conditional expressions for comparing the reference value with the time difference. The setting content of the reference is an example, any number of types may be set, and another reference may be set.

The section is information set by the user reaction information control unit 328 in order to designate information to be transmitted as the user reaction information by the user terminal 20 according to the comparison result between the time difference and the reference value. In the example illustrated in FIG. 11, Section 1, Section 2, and Section 3 are set as sections. Therefore, it is understood that the user reaction information control unit 328 selects Section 1 as the section of the target user terminal 20 in a case where the time difference acquired from the communication situation detection unit 322 is smaller than 3 seconds.

Furthermore, a section table used for the operation of the user reaction information control unit 328 in the present operation example will be described. When selecting a section of the target user terminal 20 on the basis of the comparison result between the time difference and the reference, the user reaction information control unit 328 causes the user terminal 20 to transmit information associated with the section in the section table as the user reaction information.

FIG. 12 is an explanatory diagram illustrating a specific example of the section table stored in the storage unit 310. As illustrated in FIG. 12, in the section table T4, the section, the user reaction information to be transmitted, and the information amount are associated with each other.

The section is information set by the user reaction information control unit 328 in order to designate the user reaction information to be transmitted by the target user terminal 20 according to the comparison result between the time difference and the reference. In the example illustrated in FIG. 12, Section 1, Section 2, and Section 3 are set as sections. The user reaction information control unit 328 can recognize the user reaction information to be transmitted corresponding to each section by referring to the section table T4 using the section of the communication situation reference table T3 as a foreign key. Therefore, it is understood that the user reaction information control unit 328 refers to the communication situation reference table T3 and selects Section 1 as the section of the target user terminal 20 in a case where the time difference acquired from the communication situation detection unit 322 is smaller than 3 seconds. Furthermore, the section is set such that the smaller the value of the time difference x, the larger the total amount of the user reaction information to be transmitted belonging to the section.

The user reaction information is information indicating what information the user terminal 20 transmits as the user reaction information for each section. As the user reaction information corresponding to Section 1, the whole-body video is set. Furthermore, as the user reaction information corresponding to Section 2, a face video and motion capture information are set. As the user reaction information corresponding to Section 3, an emotion (delight, impression, surprise, excitement) and degrees, waving an arm, swinging a body (dancing), jumping, applauding, shaking a head, waving, and shaking a light are set.

The information amount is information indicating an information amount of each piece of the user reaction information. It is understood that the information amount of the "whole-body video" which is the user reaction information corresponding to Section 1 is "597×246 bytes". Further, it is understood that the information amount of the "face video" which is the user reaction information corresponding to Section 2 is "128×128 bytes", and the information amount of the motion capture information is "13×3 bytes". Furthermore, the information amount of the information indicating the "emotion (delight, impression, surprise, excitement) and degree" which is the user reaction information corresponding to Section 3 is "16 bytes", and the information amount of the information indicating "waving an arm" is "1 byte". Furthermore, it is understood that the information amount of any of the user reaction information subsequent to "swinging a body (dancing)" is "1 byte".

In a case where the time difference indicating the situation of the communication path acquired from the communication situation detection unit 322 is 2 seconds, the user reaction information control unit 328 selects Section 1 as the section of the target user terminal 20 on the basis of the communication situation reference table T3. Further, the user reaction information control unit 328 issues an instruction to change the information to be transmitted as the user reaction information to the whole-body video to the target user terminal 20 on the basis of the section table T4.

Figure 13:
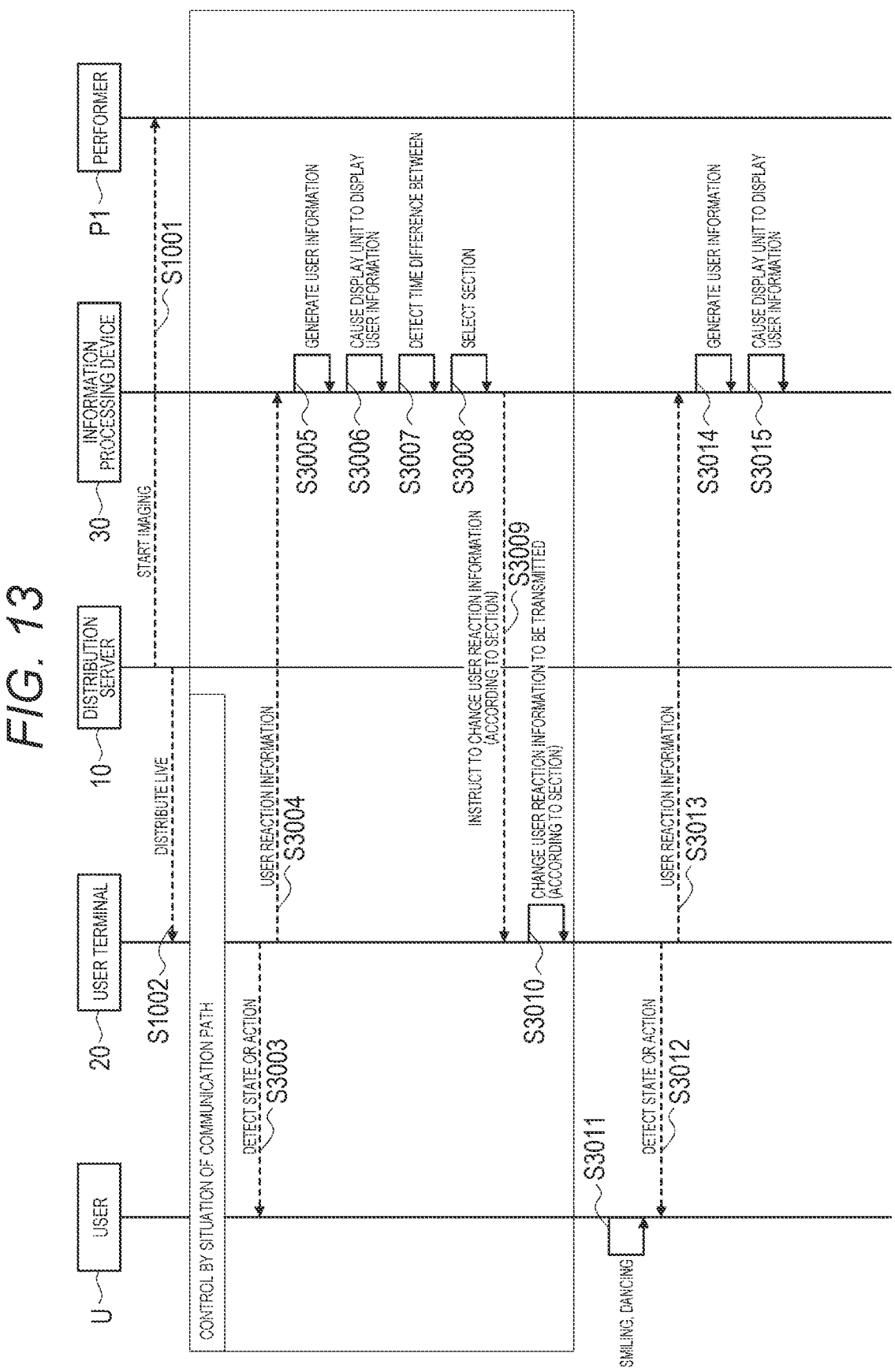
FIG. 13 is a sequence diagram illustrating a flow of Operation Example 3 of the information processing system 1 according to the same embodiment.

The communication situation reference table T3 and the section table T4 used for the operation of the user reaction information control unit 328 in the present operation example have been described above. Subsequently, the operation of the information processing system 1 in the present operation example will be sequentially described with reference to FIG. 13. FIG. 13 is a sequence diagram illustrating a flow of Operation Example 3 of the information processing system 1. Note that, among the processing included in the sequence diagram illustrated in FIG. 13, the processing of S1001 and S1002 is as described in Operation Example 1, and thus the detailed description thereof will be omitted here.

As illustrated in FIG. 10, when the live distribution is started, the processing of S1001 and S1002 is performed similarly to Operation Example 1. Furthermore, in the present operation example, in a state where the live distribution is started, the whole-body video of the user U is designated as the initial value of the information format of the information to be transmitted as the user reaction information by the user terminal 20.

The reaction information acquisition unit 240 of the user terminal 20 acquires information indicating the state and action of the user U (S3003). Next, the control unit 260 of the user terminal 20 receives and analyzes information indicating the state or action of the user U detected by the reaction information acquisition unit 240. At this time, the control unit 260 in the present operation example acquires time information at a time point when information indicating the state or action of the user U is received from the reaction information acquisition unit 240 from the distribution video information reproduced on the user terminal 20. The control unit 260 acquires the time information each time information indicating the state or action of the user U is received from the reaction information acquisition unit 240 of the user terminal 20. Alternatively, the control unit 260 may acquire the time information at preset time intervals.

The control unit 260 performs processing of analyzing the information indicating the state or action of the user U and converting the information indicating the state or action of the user U into the information format designated by the information processing device 30. Furthermore, the control unit 260 adds the time information to at least one of the information indicating the state or action of the user U or the information indicating the state or action of the user U subjected to the conversion processing, and transmits the information to the information processing device 30 as the user reaction information (S3004). In the present operation example, the whole-body video of the user U, which is the initial value, is designated as the information format. Therefore, in a case where the whole-body video of the user U has been acquired by the reaction information acquisition unit 240 as the information indicating the state and action of the user U, the control unit 260 transmits the whole-body video of the user U and the user reaction information including the time information to the information processing device 30.

Next, the display screen generation unit 326 of the information processing device 30 generates user information indicating the user U on the basis of the user reaction information acquired from the user terminal 20 (S3005). Further, the display screen generation unit 326 causes the display unit 32 to display the generated user information (S3006). In the present operation example, the display screen generation unit 326 adjusts the display size and the display position of the whole-body video of the user U, and causes the display unit 32 to display the adjusted whole-body video as the user information.

The communication situation detection unit 322 acquires the time information included in the user reaction information. The communication situation detection unit 322 detects a time difference between the time information and time information indicated by the time at which the communication unit 300 of the information processing device 30 has received the user reaction information from the user terminal 20 (S3007). The communication situation detection unit 322 provides the detected time difference to the user reaction information control unit 328 as information indicating the situation of the communication path between the user terminal 20, the distribution server 10, and the information processing device 30.

Upon receiving the time difference, the user reaction information control unit 328 compares the time difference with the reference on the basis of the communication situation reference table T3. The user reaction information control unit 328 selects a section of the user terminal 20 on the basis of the result of the comparison (S3008). The user reaction information control unit 328 instructs the user terminal 20 to change the information to be transmitted as the user reaction information by the user terminal 20 to the user reaction information to be transmitted corresponding to the selected section on the basis of the section table T4 (S3009).

In the present operation example, in a case where the time difference is 2 seconds, the user reaction information control unit 328 selects Section 1 as the section of the user terminal 20 on the basis of the communication situation reference table T3. Furthermore, the user reaction information control unit 328 recognizes that the user reaction information to be transmitted corresponding to Section 1 is the whole-body video on the basis of the section table T4. Therefore, the user reaction information control unit 328 instructs the user terminal 20 to keep the whole-body video as the information to be transmitted as the user reaction information by the user terminal 20.

Furthermore, in a case where the time difference is 4 seconds, the user reaction information control unit 328 selects Section 2 as the section of the user terminal 20 on the basis of the communication situation reference table T3. Furthermore, the user reaction information control unit 328 recognizes that the user reaction information to be transmitted corresponding to Section 2 is the face video and the motion capture information on the basis of the section table T4. In this case, the user reaction information control unit 328 causes the user terminal 20 to change the information to be transmitted as the user reaction information by the user terminal 20 to the face video and the motion capture information.

Furthermore, in a case where the time difference is 6 seconds, the user reaction information control unit 328 selects Section 3 as the section of the user terminal 20 on the basis of the communication situation reference table T3. Further, the user reaction information control unit 328 recognizes that the user reaction information to be transmitted corresponding to Section 3 is eight types of information from the "emotion (delight, impression, surprise, excitement)" to "shaking a light" illustrated in FIG. 12 on the basis of the section table T4. In this case, the user reaction information control unit 328 causes the user terminal 20 to change the information to be transmitted as the user reaction information by the user terminal 20 to the above-described eight types of information.

Upon receiving the above instruction, the user terminal 20 changes the information to be transmitted as the user reaction information of the user U to the information designated by the information processing device 30 (S3010).

Subsequently, in a case where the user U smiles and starts to dance (S3011), the reaction information acquisition unit 240 of the user terminal 20 detects information indicating the state and action of the user U (S3012). Next, the control unit 260 of the user terminal 20 receives and analyzes the information indicating the state or action of the user U detected by the reaction information acquisition unit 240, and performs processing of converting the information indicating the state or action of the user U into the information format designated by the information processing device 30. At this time, in S3010, the user terminal 20 changes the information to be transmitted as the user reaction information according to the selected section according to the instruction from the information processing device 30. The control unit 260 performs processing of converting information indicating the state or action of the user U according to the changed information. The control unit 260 transmits at least one of the information indicating the state or action of the user U or the information indicating the state or action of the user U subjected to the conversion processing to the information processing device 30 as the user reaction information (S3013).

For example, in a case where the selected section is Section 1, the control unit 260 of the user terminal 20 sets the information indicating the state or action of the user U as the whole-body video of the user U and transmits the whole-body video of the user U to the information processing device 30 as the user reaction information. In the present operation example, the whole-body video of the user U smiling and dancing is transmitted as the user reaction information.

Furthermore, in a case where the selected section is section 2, the control unit 260 processes the information indicating the state or action of the user U into the face video and the motion capture information. The control unit 260 transmits the processed face video and motion capture information to the information processing device 30 as user reaction information. In the present operation example, the face video of the user U smiling and the motion capture information of the movement of the user U dancing are transmitted to the information processing device 30 as the user reaction information.

Furthermore, in a case where the selected section is section 3, the control unit 260 performs processing of converting the information indicating the state or action of the user U into information indicating the eight types of information. The control unit 260 transmits the information indicating the above-described eight types of information subjected to the above-described conversion processing to the information processing device 30 as user reaction information. In the present operation example, since the user U is smiling, the control unit 260 generates information indicating the "emotion (delight)" and the "degree of emotion (delight) being moderate" as the information indicating the "emotion (delight, impression, surprise, excitement) and degree" of the user U. Furthermore, since the user U is dancing, the control unit 260 generates "1" as information indicating that the user U is making a reaction of "swinging a body (dancing)". As the user reaction information to be transmitted other than "emotion (delight, impression, surprise, excitement) and degree" and "swinging a body (dancing)" among the user reaction information to be transmitted corresponding to Section 3 included in the section table T4 illustrated in FIG. 12, "0" is generated by the control unit 260 since the user U does not make the corresponding reaction. The control unit 260 transmits the generated eight types of information to the information processing device 30 as user reaction information.

Next, the display screen generation unit 326 of the information processing device 30 generates user information indicating the user U on the basis of the user reaction information acquired from the user terminal 20 (S3014).

Further, the display screen generation unit 326 causes the display unit 32 to display the generated user information (S3015).

In a case where the selected section is Section 1, the user reaction information acquired by the display screen generation unit 326 is a whole-body video of the user U. The display screen generation unit 326 adjusts the display size and the display position of the whole-body video of the user U as the user information, and causes the display unit 32 to display the whole-body video.

Alternatively, in a case where the selected section is section 2, the user reaction information acquired by the display screen generation unit 326 is the face video in which the user U is smiling and the motion capture information of the movement in which the user U is dancing. The display screen generation unit 326 applies the smiling expression to the avatar indicating the user U. Furthermore, the display screen generation unit 326 applies the motion capture information to the avatar, and performs drawing control so as to indicate the movement of performing the same dance as the user U. The display screen generation unit 326 adjusts the display size and the display position of the avatar as the user information and causes the display unit 32 to display the avatar.

Alternatively, in a case where the selected section is section 3, the user reaction information acquired by the display screen generation unit 326 is information indicating the "emotion (delight)" of the user U, information indicating the "degree of emotion (delight) being moderate", and information indicating that the user U shows a reaction of "swinging a body (dancing)". In addition, the user reaction information acquired by the display screen generation unit 326 includes information indicating that the user U is not taking a reaction other than "emotion (delight)" and "swinging a body (dancing)" among the eight types of information. The display screen generation unit 326 applies information of "moderate emotion (delight)" and "swinging a body (dancing)" to the avatar indicating the user U, and causes the display unit 32 to display the avatar to which the information has been applied as the user information.

Furthermore, the display screen generation unit 326 may perform control such that the user information indicating each of the users U is displayed on the display unit 32 at a lower position of the display unit 32 and at a relatively large display size as the total amount of the information transmitted as the user reaction information of each of the users U is larger. That is, the display screen generation unit 326 displays the corresponding user information at the lower position of the display unit 32 as the user information has a relatively larger information amount and whose reaction of the user U is more detailed among the user information indicating each of the users U. Here, a specific example of a screen displayed on the display unit 32 by the display screen generation unit 326 in the present operation example will be described with reference to FIG. 14.

Figure 14:
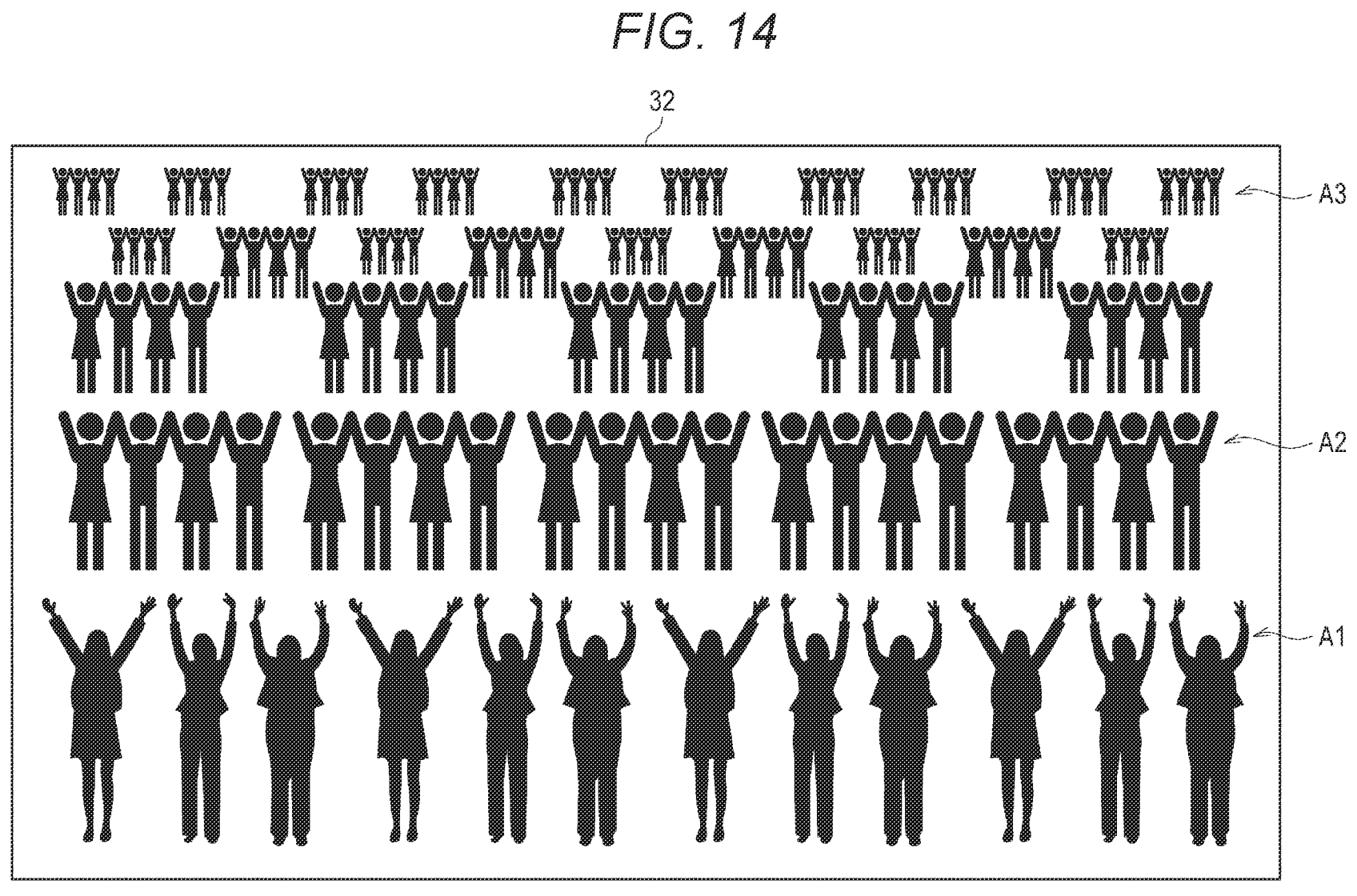

FIG. 14 is a specific example of a screen displayed on the display unit 32 under the control of the display screen generation unit 326. In the example illustrated in FIG. 14, user information A indicating each of the users U viewing the live distribution is displayed on the display unit 32.

In the example illustrated in FIG. 14, whole-body videos of a plurality of users U corresponding to Section 1 are arranged as user information A1 in the forefront row. Furthermore, avatars to which facial expressions of a plurality of users U and the motion capture information corresponding to Section 2 are applied are arranged as user information A2 in the middle row. Each of the avatars included in the user information A2 is displayed in a size smaller than each of the whole-body videos included in the user information A1 in the front row. Furthermore, in the rear row, avatars reflecting the action of any reaction of "waving an arm", "swinging a body (dancing)", "jumping", "applauding", "shaking a head", "waving", and "shaking a light" of a plurality of users U corresponding to Section 3 are arranged as user information A3. Each of the avatars included in the user information A3 is displayed at a position behind the user information A2 such that the display size decreases toward the last row.

With the configuration in which the display screen generation unit 326 controls the display as illustrated in FIG. 14, the performer P1 can look at the display unit 32 and feel as if more detailed user information is displayed closer to the performer P1. Therefore, it is possible to make the performer P1 feel realistic feeling as when performing a music live show in front of the audience in a concert hall or a venue such as an event venue.

As described above, the user reaction information control unit 328 selects a section of the user terminal 20 corresponding to the detected situation of the communication path on the basis of the situation of the communication path detected by the communication situation detection unit 322, and causes the user terminal 20 to change the user reaction information to be transmitted by the user terminal 20 according to the selected section. The situation of the communication path is detected by the time difference, and as the time difference is smaller, it is determined that the situation of the communication path is better, and further, as the situation of the communication path is determined to be better, the total amount of information to be transmitted as the user reaction information by the corresponding user terminal 20 increases. With this configuration, as the situation of the communication path between the user terminal 20 and the distribution server 10 or between the user terminal 20 and the information processing device 30 is determined to be favorable, the total amount of information to be transmitted as the user reaction information by the user terminal 20 can be increased. Conversely, as the situation of the communication path between the user terminal 20 and the distribution server 10 or between the user terminal 20 and the information processing device 30 is determined to be unsatisfactory, the total amount of information to be transmitted as the user reaction information by the user terminal 20 can be reduced.

As Operation Example 3 of the information processing system 1 according to the present embodiment, the flow of the operation in a case where the user reaction information control unit 328 of the information processing device 30 performs the information control on the basis of the user reaction information has been described above. By performing the information control as described above by the information processing device 30, in the bidirectional live distribution, in a case where the situation of the communication path is good, the reaction shown by the user can be conveyed to the performer in more detail, and in a case where the situation of the communication path is not good, the detail level of the reaction shown by the user can be lowered and conveyed to the performer.

3-4. Operation Example 4

Next, as Operation Example 4 according to the present embodiment, an operation example in a case where the user reaction information control unit 328 performs information control on the basis of the situation of the information processing load will be described. In the present operation example, the total amount of information transmitted as the user reaction information by the user terminal 20 is dynamically controlled according to the situation of the information processing load of the information processing device 30.

In the present operation example, the user reaction information control unit 328 acquires the CPU usage rate from the load detection unit 324 as the situation of the information processing load of the information processing device 30, and compares the CPU usage rate with the reference. In a case where the CPU usage rate exceeds the reference, the user reaction information control unit 328 performs information control to issue an instruction to the user terminal 20 to change the information to be transmitted as the user reaction information by the user terminal 20 such that the total amount of the user reaction information is reduced. Furthermore, in a case where the CPU usage rate falls below the reference, the user reaction information control unit 328 cancels the instruction that has caused the user terminal 20 to change the information to be transmitted as the user reaction information by the user terminal 20 such that the total amount of the user reaction information is reduced. With this configuration, it is possible to reduce the possibility that the information processing load of the information processing device 30 continues to be high during live distribution, and the processing performed by the information processing device 30 takes time or information disappears.

Figure 15:
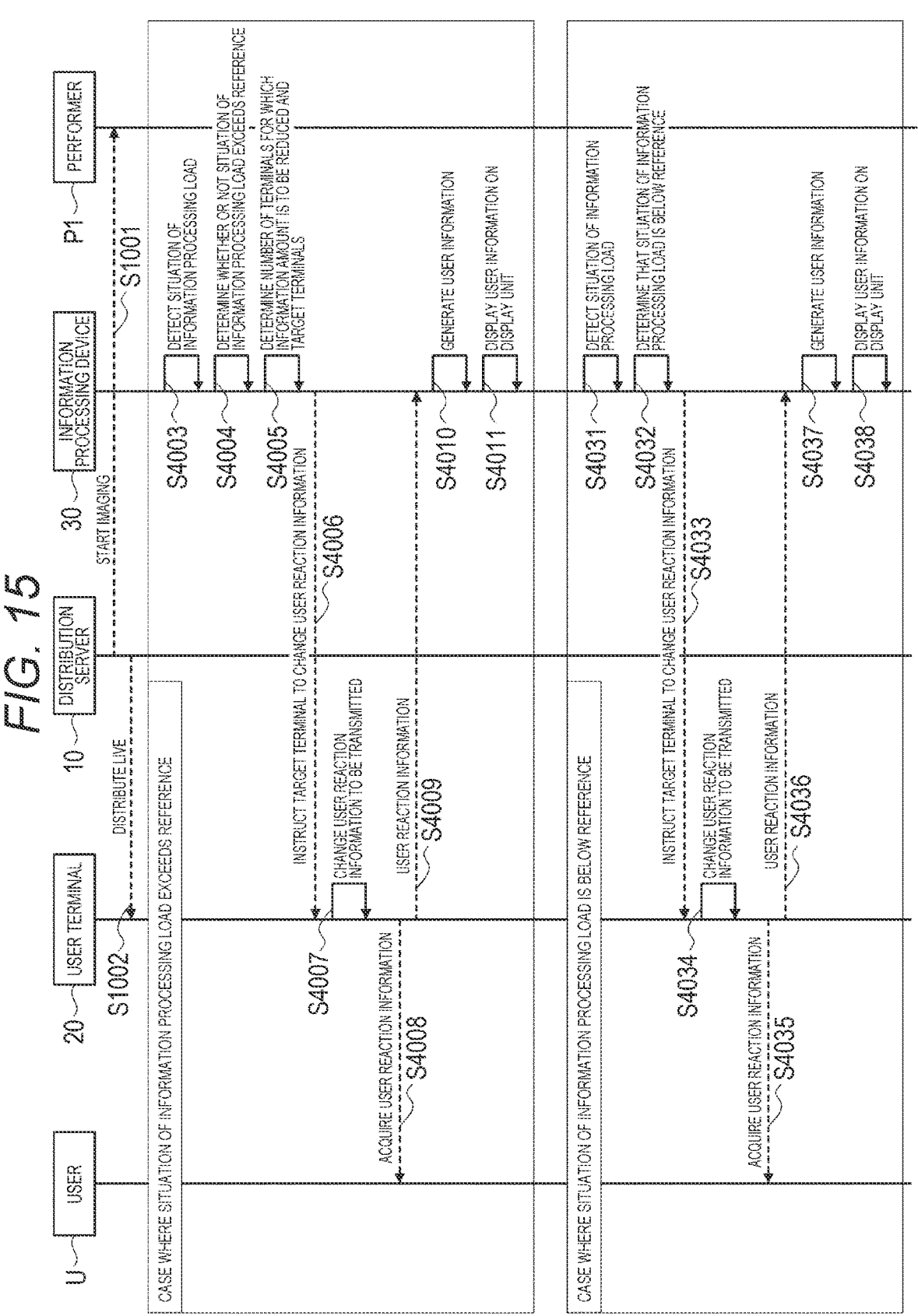
FIG. 15 is a sequence diagram illustrating a flow of Operation Example 4 of the information processing system 1 according to the same embodiment.

FIG. 15 is a sequence diagram illustrating a flow of Operation Example 4 of the information processing system 1 according to the present embodiment. Note that, among the processing included in the sequence diagram illustrated in FIG. 15, the processing of S1001 and S1002 is as described in Operation Example 1, and thus the detailed description thereof will be omitted here.

As illustrated in FIG. 15, when the live distribution is started, the processing of S1001 and S1002 is performed similarly to Operation Example 1. Furthermore, similarly to Operation Example 1, in a state where the live distribution is started, the whole-body video of the user U is designated as the initial value of the information format of the information to be transmitted as the user reaction information by the user terminal 20.

When the live distribution is started, the load detection unit 324 of the information processing device 30 detects the situation of the information processing load. In the present operation example, the load detection unit 324 calculates the CPU usage rate of the information processing device 30 (S4003). The load detection unit 324 provides the detected CPU usage rate to the user reaction information control unit 328 as the situation of the information processing load.

The user reaction information control unit 328 determines whether or not the CPU usage rate received from the load detection unit 324 exceeds a reference (S4004). The reference is set in advance by an operator of the information processing device 30. For example, the reference is 80%. Alternatively, the reference may be another value. In the present operation example, in S4004, the load detection unit 324 determines that the CPU usage rate exceeds the reference.

When determining that the CPU usage rate exceeds the reference, the user reaction information control unit 328 determines the number of target terminals for which the total amount of the user reaction information to be transmitted by the user terminal 20 is to be reduced and target terminals among the plurality of user terminals 20 (S4010). The number of terminals is determined in a range of at least one or more and equal to or less than the total number of the plurality of user terminals 20. Furthermore, the number of terminals may be fixedly set in advance by an operator of the information processing device 30 and held in the storage unit 310. Alternatively, the user reaction information control unit 328 may dynamically determine the number of terminals according to the value of the CPU usage rate. The target terminal may be randomly determined from the plurality of user terminals 20 by the user reaction information control unit 328, or may be determined by another method. Alternatively, the operator of the information processing device 30 may set a priority to each of the plurality of user terminals 20 in advance, and in this case, the user reaction information control unit 328 may determine the user terminal 20 as the target terminal in order from the user terminal 20 having a higher priority according to the determined number of terminals. Note that, in the present operation example, an example in which the user terminal 20A is determined as one of the target terminals will be described.

Furthermore, the information of the target terminal determined by the user reaction information control unit 328 is held in the storage unit 310 until the CPU usage rate falls below the reference after the processing of S4010 is performed.

The user reaction information control unit 328 instructs the target terminal determined in S4010 among the plurality of user terminals 20 to change the information to be transmitted as the user reaction information by the terminal (S4006). In the present operation example, the user reaction information control unit 328 issues the above instruction to the user terminal 20A.

Upon receiving the above instruction, the control unit 260 of the user terminal 20A changes the user reaction information to be transmitted as the user reaction information of the user U1 to information indicating the expression of the user U1 and information indicating the movement of each part of the body (S4007).

The reaction information acquisition unit 240 of the user terminal 20A detects information indicating the state or action of the user U1 (S4008).

The control unit 260 of the user terminal 20A receives and analyzes the information indicating the state or action of the user U1 detected by the reaction information acquisition unit 240, and performs processing of converting the information indicating the state or action of the user U1 according to the information format designated by the information processing device 30. In the present operation example, in S4007, the user terminal 20A changes the user reaction information to be transmitted to the expression of the user U1 and the motion capture information according to the instruction from the information processing device 30. Therefore, the control unit 260 performs processing of converting the information indicating the state or action of the user U1 into the information indicating the expression of the user U1 and the motion capture information on the basis of the result of the analysis.

The control unit 260 transmits the information indicating the state or action of the user U1 subjected to the conversion processing to the information processing device 30 as user reaction information (S4009). In the present operation example, the information indicating the expression of the user U1 and the motion capture information are transmitted as the information indicating the state or action of the user U1.

Next, the display screen generation unit 326 of the information processing device 30 generates user information indicating the user U1 on the basis of the user reaction information acquired from the user terminal 20A (S4010).

Further, the display screen generation unit 326 causes the display unit 32 to display the generated user information (S4011). In the present operation example, the display screen generation unit 326 applies the information indicating the expression to the avatar indicating the user U1. Furthermore, the display screen generation unit 326 applies the motion capture information to the avatar, and performs drawing control so as to show the same movement as the user U1. The display screen generation unit 326 adjusts the display size and the display position of the avatar as the user information and causes the display unit 32 to display the avatar.

As described above, the user reaction information control unit 328 causes one or more user terminals 20 among the plurality of user terminals 20 to change the user reaction information to be transmitted by the user terminal 20 on the basis of the situation of the information processing load detected by the load detection unit 324. With this configuration, while the information processing load of the information processing device 30 exceeds the reference, the total amount of information to be transmitted as the user reaction information by the user terminal 20 can be reduced.

Thereafter, the load detection unit 324 of the information processing device 30 continues detection of the CPU usage rate as the situation of the information processing load (S4031). The load detection unit 324 provides the detected CPU usage rate to the user reaction information control unit 328 as the situation of the information processing load.

The user reaction information control unit 328 determines whether or not the CPU usage rate received from the load detection unit 324 exceeds a reference (S4032). In the present operation example, in S4004, the load detection unit 324 determines that the CPU usage rate is below the reference.

When determining that the CPU usage rate is below the reference, the user reaction information control unit 328 instructs the user terminal 20 determined as the target terminal in S4010 to change the information to be transmitted as the user reaction information by the user terminal 20 (4033). In the present operation example, the user reaction information control unit 328 instructs the user terminal 20A to keep the whole-body video of the user U1, which is the initial value, as the information to be transmitted as the user reaction information.

Upon receiving the above instruction, the control unit 260 of the user terminal 20A changes the user reaction information to be transmitted as the user reaction information of the user U1 to the whole-body video of the user U1 (S4034).

The reaction information acquisition unit 240 of the user terminal 20A detects information indicating the state or action of the user U1 (S4035).

Subsequently, the control unit 260 transmits the user reaction information to the information processing device 30 (S4036). Here, the whole-body video of the user U1 is used as the user reaction information to be transmitted by the user terminal 20A according to the instruction from the information processing device 30. Therefore, in a case where the whole-body video of the user U1 has been acquired by the reaction information acquisition unit 240, the control unit 260 transmits the whole-body video of the user U1 to the information processing device 30 as the user reaction information (S4036).

Next, the display screen generation unit 326 of the information processing device 30 generates user information indicating the user U1 on the basis of the user reaction information acquired from the user terminal 20A (S4037). Further, the display screen generation unit 326 causes the display unit 32 to display the generated user information (S4038). In the present operation example, the display screen generation unit 326 adjusts the display size and the display position of the whole-body video of the user U1 as the user information, and causes the display unit 32 to display the whole-body video.

As described above, in a case where the situation of the information processing load detected by the load detection unit 324 falls below the reference, the user reaction information control unit 328 causes the user terminal 20 determined as the target terminal among the plurality of user terminals 20 to change the user reaction information to be transmitted by the user terminal 20 so as to increase the total amount of the user reaction information. With this configuration, while the information processing load of the information processing device 30 is below the reference, the total amount of information to be transmitted as the user reaction information by the user terminal 20 can be increased.

3-5. Supplement

The flow of the operation of the information processing system 1 according to the present embodiment has been described above using the four operation examples. In the above-described four operation examples, an example has been described in which the user reaction information control unit 328 performs only one of the information control based on the user reaction information, the information control based on the performer action information, the information control based on the situation of the communication path, and the information control based on the state of the information processing load. However, the present disclosure is not limited to the above-described operation example. The user reaction information control unit 328 may perform control by combining two or more information controls among the above four information controls. By combining the two or more information controls, the user reaction information control unit 328 can more flexibly control the total amount of the user reaction information to be transmitted by the user terminal 20.

Supplement 1

For example, an operation example in which the user reaction information control unit 328 performs information control by combining the information control based on the situation of the communication path described in Operation Example 3 and the information control based on the user reaction information described in Operation Example 1 will be described.

In the present operation example, when live distribution is started, the user reaction information control unit 328 first selects each section of the user terminal 20 by performing information control based on the situation of the communication path. Further, in a case where it is determined that the predetermined reaction information is included in the user reaction information transmitted from the user terminal 20, the user reaction information control unit 328 performs control to cause each user terminal 20 to change information to be transmitted as the user reaction information by each user terminal 20 according to the section of each user terminal 20.

First, a user specific reaction table used for the operation of the user reaction information control unit 328 in the present operation example will be described. FIG. 16 is a second specific example of the user identification reaction table in the present operation example. A user specific reaction table T11 illustrated in FIG. 16 is stored in the storage unit 310 of the information processing device 30. As illustrated in FIG. 16, in the user specific reaction table T11, the reaction information ID, the predetermined reaction of the user, Section 1, Section 2, and Section 3 are associated with each other.

The reaction information ID and the predetermined reaction of the user include the same contents as the reaction information ID and the predetermined reaction of the user included in the user specific reaction table T1 described with reference to FIG. 5 in Operation Example 1. Therefore, detailed description is omitted here.

Sections 1, 2, and 3 are information indicating what information the user reaction information control unit 328 causes the user terminal 20 to transmit as the user reaction information according to the section of the user terminal 20 in a case where any one of the predetermined reactions of the user is shown by the user. Section 1, Section 2, and Section 3 correspond to Section 1, Section 2, and Section 3 in the section table T4 described with reference to FIG. 12 in Operation Example 3. In addition, the same contents as the contents set as the user reaction information to be transmitted in the section table T4 illustrated in FIG. 12 are set in Section 1 and Section 3. For example, the whole-body video is set in Section 1. In addition, in Section 3, "angular velocity of a hand", "waving/not waving a towel", "swinging/not swinging a body", "jumping/not jumping", "applauding/not applauding", "shaking a head/not shaking a head", "waving/not waving", and "shaking a light/not shaking a light" are set.

A face video, motion capture information, and information of the position thereof are set for Section 2. In the example illustrated in FIG. 16, a face video is set as information of section 2 corresponding to the predetermined reactions of all the users of the reaction information IDs 1 to 8. Further, any one of "Mocap (hand and arm)", "Mocap (whole body)", and "Mocap (head)" is set for Section 2. Mocap indicates motion capture, and represents motion capture information of a part described in parentheses. That is, it is understood that "face video and motion capture information of a hand and an arm" is associated with the predetermined reaction "waving an arm" of the user whose reaction information ID is "1" as the information of Section 2.

In the present operation example, in a case where it is determined that the predetermined reaction information is included in the user reaction information transmitted from the user terminal 20, the user reaction information control unit 328 causes the user terminal 20 to transmit, as the user reaction information, information corresponding to the section of the user terminal 20 among the information associated with the predetermined reaction in the user specific reaction table T11. For example, in a case where it is determined that the user U1 shows an action of "shaking a head" as the predetermined reaction when Section 3 is selected as the section of the user terminal 20A, the user reaction information control unit 328 causes the user terminal 20A to change the information to be transmitted as the user reaction information by the user terminal 20A to information indicating either "shaking a head" or "not shaking a head".

The user specific reaction table T11 used for the operation of the user reaction information control unit 328 in the present operation example has been described above. Furthermore, in the present operation example, the communication situation reference table T3 in FIG. 11 and the section table T4 in FIG. 12 described in Operation Example 3 are also used for the operation of the user reaction information control unit 328. Here, "user reaction information to be transmitted" set in Section 3 of the section table T4 in the present operation example includes all the information indicating the operation set in "predetermined reaction of user" of the user specific reaction table T11.

Figure 17:
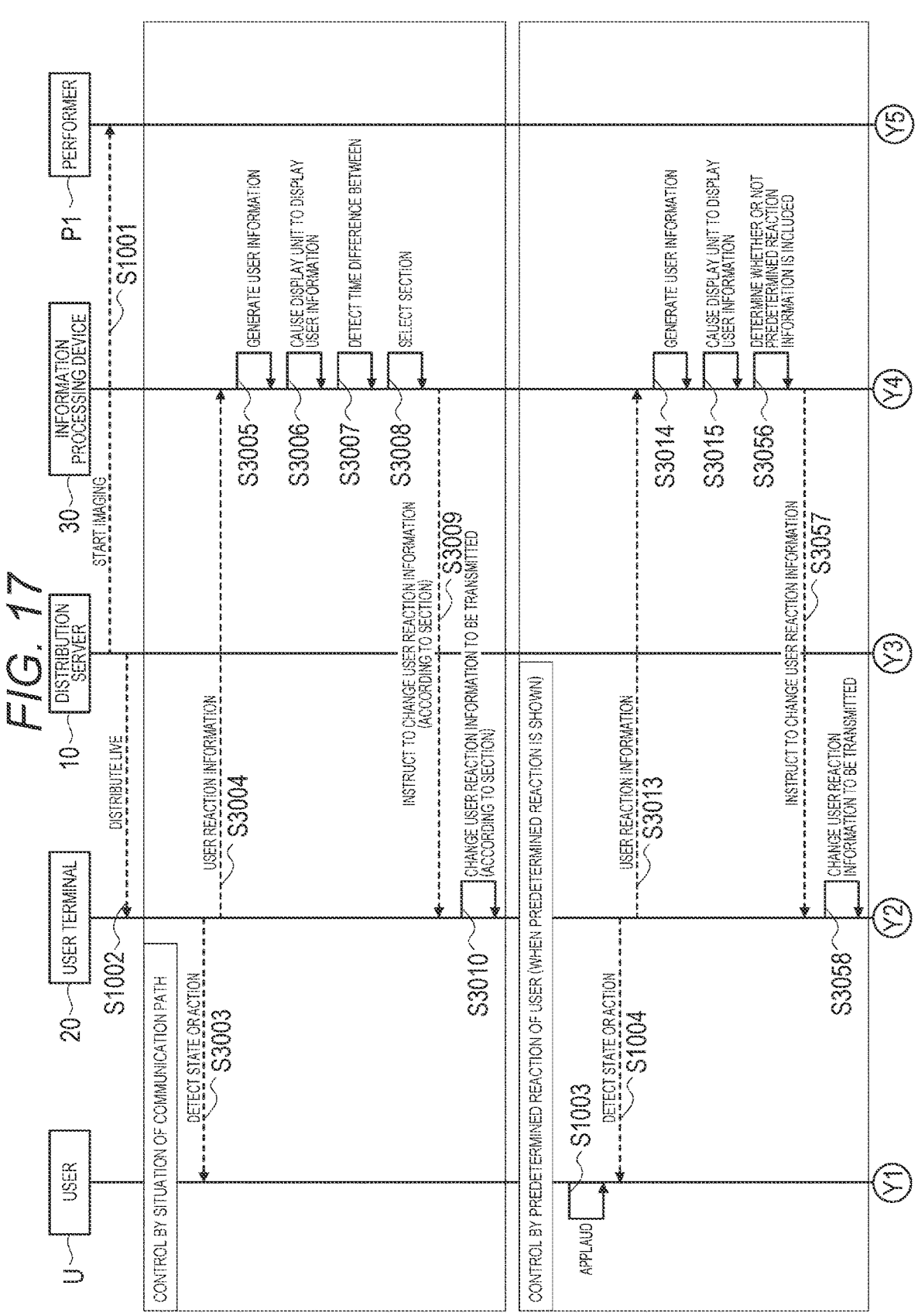
FIG. 17 is a sequence diagram illustrating a flow of an operation of the information processing system 1 according to the same embodiment.
Figure 18:
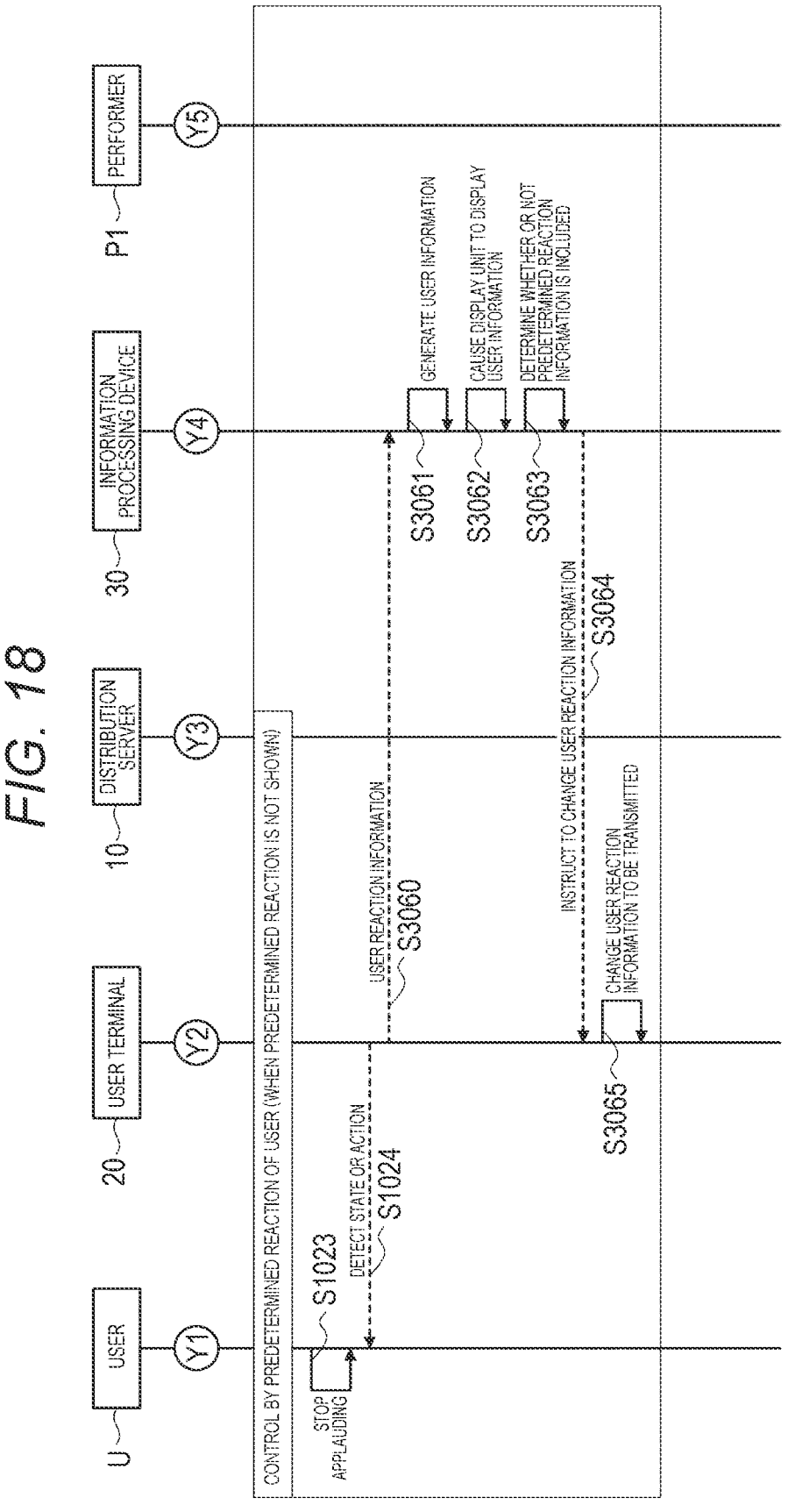
FIG. 18 is a sequence diagram illustrating a flow of an operation of the information processing system 1 according to the same embodiment.

Subsequently, the operation of the information processing system 1 in the present operation example will be sequentially described with reference to FIGS. 17 and 18. FIGS. 17 and 18 are sequence diagrams illustrating the flow of the operation of the information processing system 1 according to the present embodiment. Note that, among the processing included in the sequence diagrams illustrated in FIGS. 17 and 18, the processing of S1001 to S1004 and S1023 to S1024 is as described in Operation Example 1, and thus the detailed description thereof will be omitted here. Further, since the processing of S3003 to S3015 is as described in Operation Example 3, the detailed description thereof will be omitted here.

As illustrated in FIG. 17, when the live distribution is started, the processing of S1001 and S1002 is performed similarly to Operation Example 1. Furthermore, in the present operation example, in a state where the live distribution is started, the whole-body video of the user U is designated as the initial value of the information format of the information to be transmitted as the user reaction information by the user terminal 20.

After the processing of S1002 is performed, first, the processing of S3003 to S3010 is performed as control according to the situation of the communication path.

Thereafter, a case where the user starts to show a reaction of applauding in S1003 will be described. First, the processing of S1004 is performed. Subsequently, the processing of S3013 to S3015 is performed.

Next, the user reaction information control unit 328 of the information processing device 30 analyzes the user reaction information received from the user terminal 20, and determines whether or not predetermined reaction information is included in the user reaction information (S3056).

At this time, in a case where the section of the user terminal 20 selected in S3008 is "Section 1", the information to be transmitted as the user reaction information by the user terminal 20 in S3053 is the "whole-body video" of the user U as in the section table T4 illustrated in FIG. 12. Therefore, the user reaction information control unit 328 analyzes the whole-body video of the user U and determines whether or not the user U shows any of the predetermined reactions of the user in the user specific reaction table T11. As a result of the above analysis, the user reaction information control unit 328 recognizes that the user U shows an action of "applauding".

Furthermore, in a case where the section of the user terminal 20 selected in S3008 is "Section 2", the information to be transmitted as the user reaction information by the user terminal 20 in S3053 is the "face video" and the "motion capture information" of the user U as in the section table T4 illustrated in FIG. 12. Therefore, the user reaction information control unit 328 analyzes the face video and the motion capture information of the user U, and determines whether or not the user U shows any of the predetermined reactions of the user in the user specific reaction table T11. As a result of the above analysis, the user reaction information control unit 328 recognizes that the user U shows an action of "applauding".

Furthermore, in a case where the section of the user terminal 20 selected in S3008 is "Section 3", the information to be transmitted as the user reaction information by the user terminal 20 in S3053 is eight types of information of "emotion (delight, impression, surprise, excitement) and degree", "waving an arm", "swinging a body (dancing)", "jumping", "applauding", "shaking a head", "waving", and "shaking a light" as in the section table illustrated in FIG. 12. Therefore, the user reaction information control unit 328 analyzes the above-described eight types of information, and determines whether or not the user U shows any of predetermined reactions of the user in the user specific reaction table T11. As a result of the above analysis, the user reaction information control unit 328 recognizes that the user U shows an action of "applauding".

The user reaction information control unit 328 refers to the user specific reaction table T11 on the basis of the result of the analysis, and recognizes the user reaction information corresponding to the predetermined reaction. The user reaction information control unit 328 issues an instruction to the user terminal 20 to change the information to be transmitted as the user reaction information by the user terminal 20 on the basis of the recognition result (S3057).

For example, in a case where the section of the user terminal 20 selected in S3008 is "Section 1", the user reaction information control unit 328 refers to the user specific reaction table T11, and recognizes that the user reaction information of Section 1 corresponding to the predetermined reaction "applauding" of the user is the "whole-body video". The user reaction information control unit 328 issues an instruction to the user terminal 20 to keep the "whole-body video" as the information to be transmitted as the user reaction information by the user terminal 20 on the basis of the result of the recognition.

Alternatively, in a case where the section of the user terminal 20 selected in S3008 is "Section 2", the user reaction information control unit 328 refers to the user specific reaction table T11 and recognizes that the user reaction information of Section 2 corresponding to the predetermined reaction "applauding" of the user is "face video" and "Mocap (hand and arm)", in other words, motion capture information of a hand and an arm. The user reaction information control unit 328 issues, to the user terminal 20, an instruction to change the information to be transmitted as the user reaction information by the user terminal 20 to "face video" and "motion capture information of a hand and an arm" on the basis of the result of the recognition.

Alternatively, in a case where the section of the user terminal 20 selected in S3008 is "Section 3", the user reaction information control unit 328 refers to the user specific reaction table T11 and recognizes that the information of Section 3 corresponding to the predetermined reaction "applauding" of the user is information indicating either "applauding" or "not applauding". The user reaction information control unit 328 issues, to the user terminal 20, an instruction to change the information to be transmitted as the user reaction information by the user terminal 20 to information indicating "applauding" on the basis of the result of the recognition.

Upon receiving the above instruction, the user terminal 20 changes the information to be transmitted as the user reaction information of the user U to the information designated by the information processing device 30 (S3058).

As described above, when determining that the user U shows a reaction of "applauding", the user reaction information control unit 328 performs information control to cause the user terminal 20 to change the user reaction information to be transmitted by the user terminal 20 to information indicating "applauding" or "not applauding" in an information format according to each section. With this configuration, the total amount of the user reaction information to be transmitted to each of the user terminals 20 can be controlled in sections in three stages on the basis of the situation of the communication path. Furthermore, with the above configuration, while the user U shows a predetermined reaction, the user terminal 20 transmits, as the user reaction information, only information indicating whether or not the predetermined reaction is shown among the user reaction information to be transmitted set for each of the above-described sections in three stages. Therefore, while the user U shows a predetermined reaction, the total amount of the user reaction information transmitted from the user terminal 20 can be further reduced as compared with a case where only control based on the situation of the communication path is performed. Furthermore, even while the total amount of the user reaction information is reduced, the reaction of the user U viewing the live distribution can be conveyed to the performer P1.

Thereafter, in a case where the user U stops applauding (S1023), the processing of S1024 is performed.

Next, the control unit 260 of the user terminal 20 receives and analyzes the information indicating the state or action of the user U detected by the reaction information acquisition unit 240, and performs processing of converting the information indicating the state or action of the user U into the information format designated by the information processing device 30. The control unit 260 transmits at least one of the information indicating the state or action of the user U or the information indicating the state or action of the user U subjected to the conversion processing to the information processing device 30 as the user reaction information (S3060).

For example, in S3058, in a case where the control unit 260 has changed the information to be transmitted as the user reaction information to the "whole-body video" designated in a case where the section of the user terminal 20 is Section 1, the control unit 260 uses the "whole-body video" as the information indicating the state or action of the user U.

Alternatively, in S3058, in a case where the control unit 260 has changed the information to be transmitted as the user reaction information to the "face video" and the "motion capture information of a hand and an arm" designated in a case where the section of the user terminal 20 is Section 2, the control unit 260 performs processing of converting the information indicating the state or action of the user U into the "face video" and the "motion capture information of a hand and an arm".

Alternatively, in S3058, in a case where the control unit 260 has changed the information to be transmitted as the user reaction information to the information indicating "applauding" designated in a case where the section of the user terminal 20 is Section 3, the control unit 260 performs processing of converting the information indicating the state or action of the user U into the information indicating "applauding".

Subsequently, the display screen generation unit 326 of the information processing device 30 generates user information indicating the user U on the basis of the user reaction information acquired from the user terminal 20 (S3061). Furthermore, the display screen generation unit 326 adjusts the display size and the display position of the user information, and causes the display unit 32 to display the adjusted user information (S3062).

At this time, in a case where the user reaction information is the "whole-body video", the display screen generation unit 326 adjusts the display size and the display position of the whole-body video of the user U as the user information, and displays the whole-body video on the display unit 32. In the present operation example, since the user U stops applauding in S1023, the whole-body video in which the user U is performing an operation other than applauding is displayed on the display unit 32 as the user information.

Alternatively, in a case where the user reaction information is the "face video" and the "motion capture information of a hand and an arm", the display screen generation unit 326 applies the same expression as the face video to the avatar indicating the user U. Furthermore, the display screen generation unit 326 applies the motion capture information of a hand and an arm to the avatar, and performs drawing control so as to indicate a movement that is performing the same action as the user U. Since the user U has stopped applauding in S1023, the avatar indicating the user U is caused to stop applauding here. The display screen generation unit 326 adjusts the display size and the display position of the avatar as the user information and causes the display unit 32 to display the avatar.

Alternatively, in a case where the user reaction information is information indicating "not applauding", the display screen generation unit 326 applies information indicating "not applauding" to the avatar indicating the user U, adjusts the display size and the display position of the avatar to which the information has been applied as the user information, and displays the user information on the display unit 32.

Next, the user reaction information control unit 328 determines whether or not predetermined reaction information is included in the user reaction information (S3063). In the present operation example, the user reaction information control unit 328 determines that the information indicating the state or action of the user U included in the user reaction information does not show a predetermined reaction.

The user reaction information control unit 328 causes the user terminal 20 to change the information to be transmitted as the user reaction information by the user terminal 20 to the user reaction information to be transmitted according to the section of the user terminal 20 on the basis of the result of the determination and the section table T4 (S3064).

For example, in a case where the section of the user terminal 20 selected in S3008 is Section 1, the user reaction information control unit 328 recognizes that the user reaction information to be transmitted corresponding to Section 1 is the whole-body video on the basis of the section table T4. Therefore, the user reaction information control unit 328 causes the user terminal 20 to change the information to be transmitted as the user reaction information by the user terminal 20 to the whole-body video.

Furthermore, in a case where the section of the user terminal 20 selected in S3008 is Section 2, the user reaction information control unit 328 recognizes that the user reaction information to be transmitted corresponding to Section 2 is the face video and the motion capture information on the basis of the section table T4. In this case, the user reaction information control unit 328 causes the user terminal 20 to change the information to be transmitted as the user reaction information by the user terminal 20 to the face video and the motion capture information.

Alternatively, in a case where the section of the user terminal 20 selected in S3008 is Section 3, the user reaction information control unit 328 recognizes that the user reaction information to be transmitted corresponding to Section 3 is eight types of information from the "emotion (delight, impression, surprise, excitement)" to "shaking a light" illustrated in FIG. 12 on the basis of the section table T4. In this case, the user reaction information control unit 328 causes the user terminal 20 to change the information to be transmitted as the user reaction information by the user terminal 20 to the above-described eight types of information.

Upon receiving the above instruction, the user terminal 20 changes the user reaction information to be transmitted as the user reaction information of the user U to the information format designated in the information processing device 30 (S3058).

The flows of operations in a case where the user reaction information control unit 328 of the information processing device 30 performs the information control based on the situation of the communication path and the information control based on the user reaction information have been described above. By performing the information control as described above by the information processing device 30, in the bidirectional live distribution, in a case where the situation of the communication path is good, the reaction shown by the user U can be conveyed to the performer in more detail, and further, in a case where the situation of the communication path is not good, the detail level of the reaction shown by the user U can be lowered and conveyed to the performer. Furthermore, while the user U shows a predetermined reaction, the total amount of information to be transmitted as the user reaction information by the user terminal 20 can be further suppressed. Furthermore, in a case where the user U no longer shows a predetermined reaction, the total amount of information to be transmitted as the user reaction information by the user terminal 20 can be increased within a range in which control based on the situation of the communication path is performed.

Supplement 2

Furthermore, similarly, the user reaction information control unit 328 can also be configured to perform information control by combining the information control based on the situation of the communication path and the information control based on the performer action information. In that case, the user reaction information control unit 328 can further suppress the total amount of information to be transmitted as the user reaction information while the performer P1 shows a predetermined action while dynamically controlling the total amount of information to be transmitted as the user reaction information by the user terminal 20 on the basis of the situation of the communication path.

Supplement 3

Furthermore, a configuration in which the user reaction information control unit 328 performs information control by combining three of the information control based on the situation of the communication path, the information control based on the user reaction information, and the information control based on the performer action information is more effective.

Supplement 4

Alternatively, similarly to the above-described operation example, the user reaction information control unit 328 can also be configured to perform information control by combining the information control based on the situation of the information processing load and the information control based on the user reaction information. In that case, the user reaction information control unit 328 may set the initial value of the information to be transmitted as the user reaction information by the user terminal 20 as the face video and the motion capture information of the user U. Furthermore, while the situation of the information processing load of the information processing device 30 exceeds the reference, the user reaction information control unit 328 may suppress the total amount of information to be transmitted as the user reaction information by the user terminal 20 by performing information control based on the user reaction information. Furthermore, the user reaction information control unit 328 may not perform the information control based on the user reaction information while the situation of the information processing load is below the reference. With this configuration, the information control based on the user reaction information is performed only while the situation of the information processing load of the information processing device 30 is determined to be higher than the reference. Furthermore, with this configuration, while the situation of the information processing load of the information processing device 30 is determined to be lower than the reference, even if the user U shows a predetermined reaction, the information control based on the user reaction information is not performed. Therefore, while the situation of the information processing load is lower than the reference, the detail level of the information to be conveyed as the user reaction information by the user terminal 20 is not reduced, so that the reaction of the user U can be conveyed to the performer P1 in detail.

Supplement 5

Similarly, the user reaction information control unit 328 can also be configured to perform information control by combining the information control based on the situation of the information processing load and the information control based on the performer action information.

Supplement 6

Furthermore, a configuration in which the user reaction information control unit 328 performs information control by combining three of the information control based on the situation of the information processing load, the information control based on the user reaction information, and the information control based on the performer action information is more effective. In that case, while the situation of the information processing load is determined to be higher than the reference, the total amount of information to be transmitted as the user reaction information by the user terminal 20 can be further suppressed.

Supplement 7

Furthermore, the user reaction information control unit 328 can also be configured to perform information control by combining two of the information control based on the situation of the communication path and the information control based on the state of the information processing load. In this case, while the user reaction information control unit 328 determines that the situation of the information processing load is higher than the reference, processing of limiting the section set in the user terminal 20 on the basis of the situation of the communication path to a section in which the total amount of the user reaction information to be transmitted belonging to the section is relatively low among all the sections may be performed. For example, in a case where it is determined that the situation of the information processing load exceeds the reference, the user reaction information control unit 328 may limit the choices to be selected as the section of each of the user terminals 20 on the basis of the situation of the communication path to Section 2 and Section 3, and may not select Section 1. Furthermore, while the user reaction information control unit 328 determines that the situation of the information processing load has fallen below the reference, the above-described limitation may be released, and as described in Operation Example 3, only the information control based on the situation of the communication path may be performed. With this configuration, the total amount of information to be transmitted as the user reaction information by the user terminal 20 can be controlled more flexibly as compared with a case where only one of the information control based on the situation of the communication path and the information control based on the state of the information processing load is performed.

Supplement 8

Furthermore, in addition to two of the information control based on the situation of the communication path and the information control based on the situation of the information processing load, the user reaction information control unit 328 can also be configured to perform the information control by combining one or both of the information control based on the user reaction information and the information control based on the performer action information.

4. HARDWARE CONFIGURATION EXAMPLE

Figure 19:
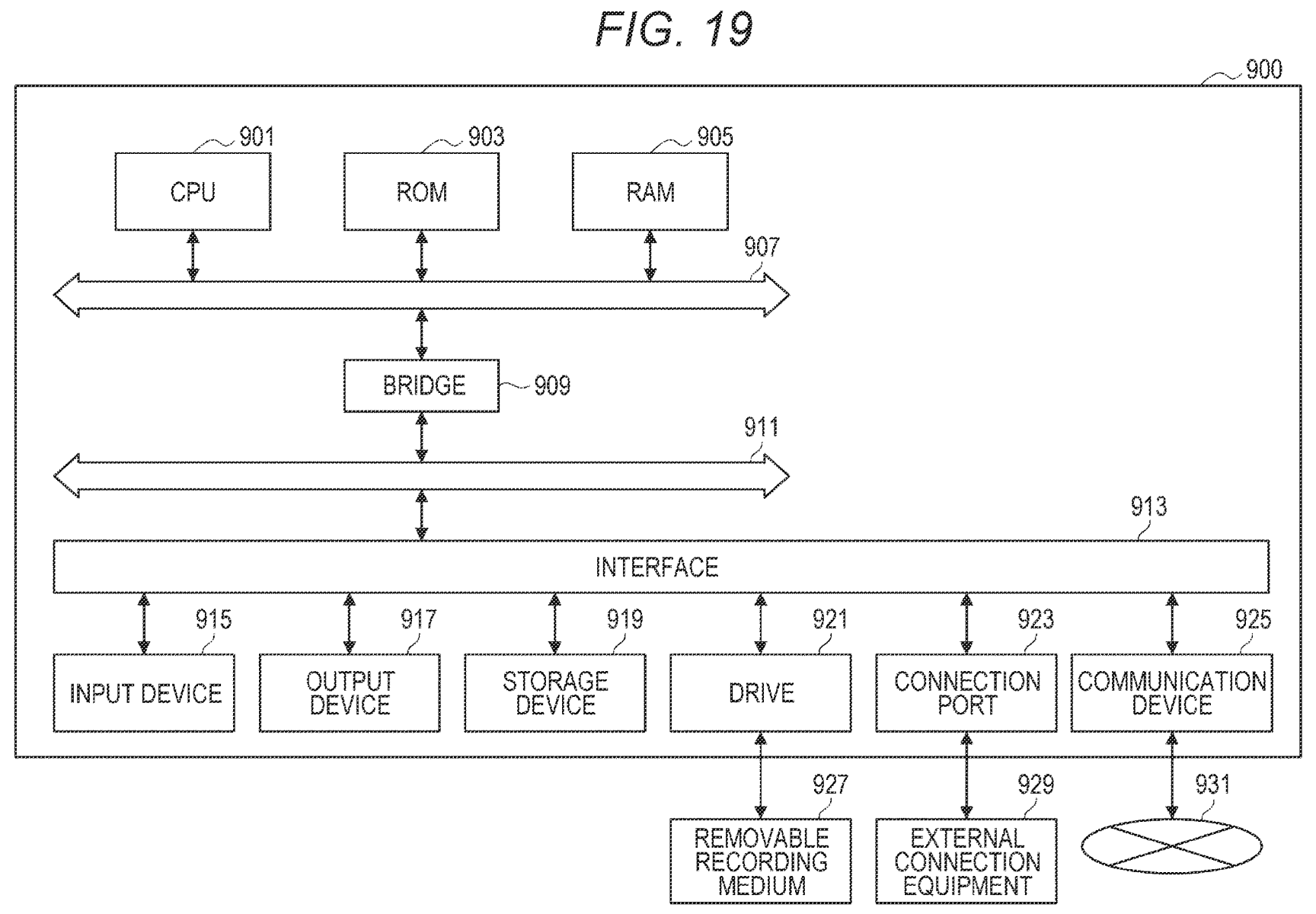

Next, a hardware configuration example of the information processing device according to the embodiment of the present disclosure will be described with reference to FIG. 19. The processing by the distribution server 10, the user terminal 20, and the information processing device 30 described above can be implemented by one or a plurality of information processing devices. FIG. 19 is a block diagram illustrating a hardware configuration example of an information processing device 900 that implements the distribution server 10, the user terminal 20, and the information processing device 30 according to the embodiment of the present disclosure. Note that, the information processing device 900 does not necessarily have the entire hardware configuration illustrated in FIG. 19. Furthermore, a part of the hardware configuration illustrated in FIG. 19 may not exist in the distribution server 10, the user terminal 20, or the information processing device 30.

As illustrated in FIG. 19, the information processing device 900 includes a CPU 901, a read only memory (ROM) 903, and a RAM 905. Furthermore, the information processing device 900 may include a host bus 907, a bridge 909, an external bus 911, an interface 913, an input device 915, an output device 917, a storage device 919, a drive 921, a connection port 923, and a communication device 925. The information processing device 900 may include a processing circuit called a graphics processing unit (GPU), a digital signal processor (DSP), or an application specific integrated circuit (ASIC) instead of or in addition to the CPU 901.

The CPU 901 functions as an arithmetic processor and a control device, and controls overall operation in the information processing device 900 or a part thereof, in accordance with various programs recorded in the ROM 903, the RAM 905, the storage device 919, or a removable recording medium 927. The ROM 903 stores programs, calculation parameters, and the like used by the CPU 901. The RAM 905 temporarily stores a program used in execution by the CPU 901, parameters that change as appropriate during the execution, and the like. The CPU 901, the ROM 903, and the RAM 905 are mutually connected by the host bus 907 including an internal bus such as a CPU bus. Moreover, the host bus 907 is connected to the external bus 911 such as a peripheral component interconnect/interface (PCI) bus via the bridge 909.

The input device 915 is, for example, a device operated by the user, such as a button. The input device 915 may include a mouse, a keyboard, a touch panel, a switch, a lever, or the like. Furthermore, the input device 915 may also include a microphone that detects voice of the user. The input device 915 may be, for example, a remote control device using infrared rays or other radio waves, or may be external connection equipment 929 such as a mobile phone adapted to the operation of the information processing device 900. The input device 915 includes an input control circuit that generates and outputs an input signal to the CPU 901 on the basis of the information input by the user. By operating the input device 915, the user inputs various kinds of data or gives an instruction to perform a processing operation, to the information processing device 900.

Furthermore, the input device 915 may include an imaging device and a sensor. The imaging device is, for example, a device that generates a captured image by imaging a real space using various members such as an imaging element such as a charge coupled device (CCD) or a complementary metal oxide semiconductor (CMOS), and a lens for controlling image formation of a subject image on the imaging element. The imaging device may capture a still image or may capture a moving image.

The sensor is, for example, a sensor of various kinds, such as a distance measuring sensor, an acceleration sensor, a gyro sensor, a geomagnetic sensor, a vibration sensor, a light sensor, or a sound sensor. The sensor obtains information regarding a state of the information processing device 900 itself such as attitude of a casing of the information processing device 900, and information regarding a surrounding environment of the information processing device 900 such as brightness and noise around the information processing device 900, for example. Furthermore, the sensor may also include a global positioning system (GPS) sensor that receives a GPS signal to measure the latitude, longitude, and altitude of the device.

The output device 917 includes a device that can visually or audibly notify the user of acquired information. The output device 917 may be, for example, a display device such as a liquid crystal display (LCD) or an organic electroluminescence (EL) display, a sound output device such as a speaker or a headphone, or the like. Furthermore, the output device 917 may include a plasma display panel (PDP), a projector, a hologram, a printer device, or the like. The output device 917 outputs a result of processing performed by the information processing device 900 as a video such a text or an image, or outputs the result as a sound such as voice or audio. Furthermore, the output device 917 may include a lighting device or the like that brightens the surroundings.

The storage device 919 is a data storage device configured as an example of a storage unit of the information processing device 900. The storage device 919 includes, for example, a magnetic storage device such as a hard disk drive (HDD), a semiconductor storage device, an optical storage device, a magneto-optical storage device, or the like. The storage device 919 stores programs executed by the CPU 901 and various kinds of data, various kinds of data acquired from the outside, and the like.

The drive 921 is a reader/writer for the removable recording medium 927, such as a magnetic disk, an optical disc, a magneto-optical disk, or a semiconductor memory, and is built in or externally attached to the information processing device 900. The drive 921 reads information recorded in the mounted removable recording medium 927, and outputs the read information to the RAM 905. Furthermore, the drive 921 writes records in the mounted removable recording medium 927.

The connection port 923 is a port for directly connecting equipment to the information processing device 900. The connection port 923 may be, for example, a universal serial bus (USB) port, an IEEE1394 port, a small computer system interface (SCSI) port, or the like. Furthermore, the connection port 923 may be an RS-232C port, an optical audio terminal, a high-definition multimedia interface (HDMI (registered trademark)) port, or the like. By connecting the external connection equipment 929 to the connection port 923, various kinds of data can be exchanged between the information processing device 900 and the external connection equipment 929.

The communication device 925 is, for example, a communication interface including a communication device or the like for connecting to the network 5. The communication device 925 may be, for example, a communication card for wired or wireless local area network (LAN), Bluetooth (registered trademark), Wi-Fi (registered trademark), or wireless USB (WUSB). Furthermore, the communication device 925 may be a router for optical communication, a router for asymmetric digital subscriber line (ADSL), a modem for various types of communication, or the like. For example, the communication device 925 transmits and receives signals and the like to and from the Internet and other communication equipment, by using a predetermined protocol such as TCP/IP. Furthermore, the network 5 connected to the communication device 925 is a network connected in a wired or wireless manner, and is, for example, the Internet, a home LAN, infrared communication, radio wave communication, satellite communication, or the like.

5. CONCLUSION

While the preferred embodiments of the present disclosure have been described above in detail with reference to the accompanying drawings, the present invention is not limited to such examples. It is apparent that a person having ordinary knowledge in the technical field to which the present disclosure belongs can devise various change examples or modification examples within the scope of the technical idea described in the claims, and it will be naturally understood that such examples also belong to the technical scope of the present invention.

For example, the steps in the processing of the operations of the distribution server 10, the user terminal 20, and the information processing device 30 according to the present embodiment do not necessarily need to be processed in time series in the order described as the explanatory diagrams. For example, the steps in the processing of the operations of the distribution server 10, the user terminal 20, and the information processing device 30 may be processed in an order different from the order described as the explanatory diagrams, or may be processed in parallel.

Furthermore, it is also possible to create one or more computer programs for causing hardware such as the CPU, the ROM, and the RAM built in the information processing device 900 described above to exhibit the functions of the information processing system 1. Furthermore, a computer-readable storage medium that stores the one or more computer programs is also provided.

Furthermore, the effects described in the present specification are merely exemplary or illustrative, and are not restrictive. That is, the technology according to the present disclosure may exert other effects apparent to those skilled in the art from the description of the present specification in addition to or instead of the effects described above.

Note that, the present technology may also have the following configurations.

(1)

An information processing device including: a user reaction information control unit configured to perform information control for causing a user terminal to output second user reaction information having an information amount different from an information amount of first user reaction information on a basis of the first user reaction information output from the user terminal used by a user viewing a distribution content and indicating a reaction of the user.

(2)

The information processing device according to (1), in which the second user reaction information has an information amount smaller than an information amount of the first user reaction information, and the user reaction information control unit causes the user terminal to output the second user reaction information as the information control in a case where the first user reaction information includes predetermined reaction information.

(3)

The information processing device according to (2), in which, in a case where the second user reaction information does not include the predetermined reaction information, the user reaction information control unit causes the user terminal to output the first user reaction information.

(4)

The information processing device according to (2) or (3), including a communication situation detection unit configured to detect a situation of a communication path through which the distribution content and user reaction information that is the first user reaction information or the second user reaction information are transmitted and received, in which the user reaction information control unit performs the information control in a case where a result of the detection of the situation of the communication path indicates a situation equal to or less than a reference.

(5)

The information processing device according to (4), in which the user reaction information control unit selects any section among a plurality of sections having different total amounts of information belonging to the respective sections on the basis of a result of detection of the situation of the communication path, and causes the user terminal to output information belonging to a selected section as the user reaction information in a case where the user reaction information output from the user terminal does not include predetermined reaction information.

(6)

The information processing device according to (5), in which the distribution content includes time information, the communication situation detection unit detects, as detection of the situation of the communication path, a time difference between a time at which the user reaction information control unit has received the user reaction information and a time indicated by time information of the distribution content being reproduced on the user terminal at a time point at which the user reaction information is output by the user terminal, and the user reaction information control unit selects a section having a larger total amount of belonging information as the time difference is smaller.

(7)

The information processing device according to (1), in which the first user reaction information is related to an action of the user.

(8)

The information processing device according to (6), in which the plurality of sections includes a first section, a second section, and a third section, information belonging to the first section is a whole-body video of the user, information belonging to the second section includes face video and motion capture information of the user, and information belonging to the third section includes action information of a predetermined part of a body of the user.

(9)

The information processing device according to any one of (1) to (8), in which the user terminal includes a plurality of user terminals, the information processing device includes a load detection unit that detects a state of an information processing load of the information processing device, and the user reaction information control unit performs the information control on one or more user terminals among the plurality of user terminals in a case where a situation of the information processing load detected by the load detection unit exceeds a reference.

(10)

An information processing device including: a user reaction information control unit configured to perform information control of causing a user terminal that is used by a user viewing a distribution content and is outputting first user reaction information indicating a reaction of the user to output second user reaction information having an information amount different from an information amount of the first user reaction information on a basis of performer action information indicating an action of a performer appearing in the distribution content.

(11)

The information processing device according to (10), in which the second user reaction information has an information amount smaller than an information amount of the first user reaction information, the performer action information includes information indicating presence or absence of a predetermined action, and the user reaction information control unit causes the user terminal to output the second user reaction information as the information control in a case where the performer action information includes predetermined action information on a basis of information indicating presence or absence of the predetermined action.

(12)

The information processing device according to (11), in which in a case where the performer action information does not include the predetermined action information, on the basis of the information indicating the presence or absence of the predetermined action, the user reaction information control unit causes the user terminal to output the first user reaction information.

(13)

The information processing device according to (11) or (12), including a communication situation detection unit configured to detect a situation of a communication path through which the distribution content and user reaction information that is the first user reaction information or the second user reaction information are transmitted and received, in which the user reaction information control unit performs the information control in a case where a result of the detection of the situation of the communication path indicates a situation equal to or less than a reference.

(14)

The information processing device according to (13), in which the user reaction information control unit selects any section among a plurality of sections having different total amounts of information belonging to the respective sections on the basis of a result of detection of the situation of the communication path, and causes the user terminal to output information belonging to a selected section as the user reaction information in a case where the user reaction information output from the user terminal does not include predetermined reaction information.

(15)

The information processing device according to (14), in which the distribution content includes time information, the communication situation detection unit detects, as detection of the situation of the communication path, a time difference between a time at which the user reaction information control unit has received the user reaction information and a time indicated by time information of the distribution content being reproduced on the user terminal at a time point at which the user reaction information is output by the user terminal, and the user reaction information control unit selects a section having a larger total amount of belonging information as the time difference is smaller.

(16)

The information processing device according to (10), in which the first user reaction information is related to an action of the user.

(17)

The information processing device according to (15), in which the plurality of sections includes a first section, a second section, and a third section, information belonging to the first section is a whole-body video of the user, information belonging to the second section includes face video and motion capture information of the user, and information belonging to the third section includes action information of a predetermined part of a body of the user.

(18)

The information processing device according to any one of (10) to (17), in which the user terminal includes a plurality of user terminals, the information processing device includes a load detection unit configured to detect a situation of an information processing load of the information processing device, and the user reaction information control unit performs the information control on one or more user terminals among the plurality of user terminals in a case where the situation of the information processing load detected by the load detection unit exceeds a reference.

(19)

An information processing method including: causing, by a processor, a user terminal to output second user reaction information having an information amount different from an information amount of first user reaction information on a basis of the first user reaction information output from the user terminal used by a user viewing a distribution content and indicating a reaction of the user.

REFERENCE SIGNS LIST

1 Information processing system
10 Distribution server
12 Imaging unit
140 Performer action detection unit
150 Control unit
20 User terminal
240 Reaction information acquisition unit
260 Control unit
30 Information processing device
320 Control unit
322 Communication situation detection unit
324 Load detection unit
326 Display screen generation unit
328 User reaction information control unit
32 Display unit
900 Information processing device

The invention claimed is:

1. An information processing device, comprising:

processing circuitry configured to perform information control to control a user terminal to output second user reaction information in a case that first user reaction information output from the user terminal includes predetermined reaction information; and control the user terminal to output the first user reaction information in a case that the second user reaction information does not include the predetermined reaction information, wherein the second user reaction information has an information amount smaller than an information amount of first user reaction information, the user terminal is used by a user viewing a distribution content, and the first user reaction information indicates a reaction of the user.

2. The information processing device according to claim 1 wherein the processing circuitry is further configured to detect a situation of a communication path through which the distribution content and user reaction information, that is the first user reaction information or the second user reaction information, are transmitted and received, and perform the information control in a case where a result of detection of the situation of the communication path indicates a situation equal to or less than a reference.

3. The information processing device according to claim 2, wherein the processing circuitry is further configured to select any section among a plurality of sections having different total amounts of information belonging to respective sections based on a result of detection of the situation of the communication path, and control the user terminal to output information belonging to a selected section as the user reaction information in a case where the user reaction information output from the user terminal does not include predetermined reaction information.

4. The information processing device according to claim 3, wherein the distribution content includes time information, the processing circuitry detects, as detection of the situation of the communication path, a time difference between a time at which the processing circuitry has received the user reaction information and a time indicated by time information of the distribution content being reproduced on the user terminal at a time point at which the user reaction information is output by the user terminal, and the processing circuitry selects a section having a larger total amount of belonging information as the time difference is smaller.

5. The information processing device according to claim 4, wherein the plurality of sections includes a first section, a second section, and a third section, information belonging to the first section is a whole-body video of the user, information belonging to the second section includes face video and motion capture information of the user, and information belonging to the third section includes action information of a predetermined part of a body of the user.

6. The information processing device according to claim 5, wherein the user terminal includes a plurality of user terminals, the processing circuitry is further configured to detect a situation of an information processing load of the information processing device, and the processing circuitry performs the information control on one or more user terminals among the plurality of user terminals in a case where the situation of the information processing load detected by the processing circuitry exceeds a reference.

7. The information processing device according to claim 1, wherein the first user reaction information is related to an action of the user.

8. An information processing device, comprising:

processing circuitry configured to perform information control to control a user terminal, that is used by a user viewing a distribution content and is outputting first user reaction information indicating a reaction of the user, to output second user reaction information in a case that the performer action information indicates presence of a predetermined action, based on performer action information indicating an action of a performer appearing in the distribution content, wherein the performer action information further includes information indicating presence or absence of the predetermined action, and the second user reaction information has an information amount smaller than an information amount of the first user reaction information.

9. The information processing device according to claim 8, wherein in a case where the performer action information indicates absence of the predetermined action, the processing circuitry controls the user terminal, based on the performer action information, to output the first user reaction information.

10. The information processing device according to claim 9, wherein the processing circuitry is further configured to detect a situation of a communication path through which the distribution content and user reaction information that is the first user reaction information or the second user reaction information are transmitted and received, and perform the information control in a case where a result of the detection of the situation of the communication path indicates a situation equal to or less than a reference.

11. The information processing device according to claim 10, wherein the processing circuitry is further configured to select any section among a plurality of sections having different total amounts of information belonging to respective sections on the basis of a result of detection of the situation of the communication path, and control the user terminal to output information belonging to a selected section as the user reaction information in a case where the user reaction information output from the user terminal does not include predetermined reaction information.

12. The information processing device according to claim 11, wherein the distribution content includes time information, the processing circuitry detects, as detection of the situation of the communication path, a time difference between a time at which the processing circuitry has received the user reaction information and a time indicated by time information of the distribution content being reproduced on the user terminal at a time point at which the user reaction information is output by the user terminal, and the processing circuitry selects a section having a larger total amount of belonging information as the time difference is smaller.

13. The information processing device according to claim 12, wherein the plurality of sections includes a first section, a second section, and a third section, information belonging to the first section is a whole-body video of the user, information belonging to the second section includes face video and motion capture information of the user, and information belonging to the third section includes action information of a predetermined part of a body of the user.

14. The information processing device according to claim 13, wherein the user terminal includes a plurality of user terminals, the processing circuitry is further configured to detect a situation of an information processing load of the information processing device, and the processing circuitry performs the information control on one or more user terminals among the plurality of user terminals in a case where the situation of the information processing load detected by the processing circuitry exceeds a reference.

15. The information processing device according to claim 8, wherein the first user reaction information is related to an action of the user.

16. An information processing method, comprising:

controlling, by processing circuitry of an information processing device, a user terminal to output second user reaction information in a case that the first user reaction information output from the user terminal includes the predetermined reaction information; and controlling, by the processing circuitry, the user terminal to output the first user reaction information in a case that the second user reaction information does not include the predetermined reaction information, wherein the second user reaction information has an information amount smaller than an information amount of first user reaction information, the user terminal is used by a user viewing a distribution content, and the first user reaction information indicates a reaction of the user.

\* \* \* \* \*